United States Patent
Bilic et al.

(10) Patent No.: US 12,469,401 B2
(45) Date of Patent: *Nov. 11, 2025

(54) METHODS AND SYSTEMS FOR IMPROVING RESOURCE CONTENT MAPPING FOR AN ELECTRONIC LEARNING SYSTEM

(71) Applicant: D2L Corporation, Kitchener (CA)

(72) Inventors: Jugoslav Bilic, Kitchener (CA); Stephen John Michaud, Kitchener (CA); Martin David Goodenough Bayly, Kitchener (CA); Ryan Clayton Ogg, Kitchener (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,054

(22) Filed: Mar. 20, 2024

(65) Prior Publication Data

US 2024/0312355 A1    Sep. 19, 2024

Related U.S. Application Data

(63) Continuation of application No. 17/854,438, filed on Jun. 30, 2022, now Pat. No. 11,967,251, which is a continuation of application No. 16/922,664, filed on Jul. 7, 2020, now Pat. No. 11,410,563, which is a continuation of application No. 14/729,612, filed on Jun. 3, 2015, now Pat. No. 10,748,436.

(51) Int. Cl.
*G09B 5/00*    (2006.01)
(52) U.S. Cl.
CPC ..................... *G09B 5/00* (2013.01)

(58) Field of Classification Search
CPC ... G09B 5/02; G09B 5/04; G09B 5/06; G09B 5/062; G09B 5/065; G09B 5/067; G09B 5/08; G09B 5/10; G09B 5/12; G09B 5/125; G09B 5/14
See application file for complete search history.

(56) References Cited

U.S. PATENT DOCUMENTS

| | | |
|---|---|---|
| 6,324,282 B1 | 11/2001 | McIllwaine |
| 8,879,978 B1 | 11/2014 | Bamhart |
| 2003/0040949 A1 | 2/2003 | Baccaro et al. |
| 2003/0059760 A1 | 3/2003 | Tojek et al. |
| 2003/0179932 A1 | 9/2003 | Katsuyama |
| 2004/0063085 A1 | 4/2004 | Ivanir et al. |
| 2004/0076941 A1 | 4/2004 | Cunningham et al. |
| 2004/0161734 A1 | 8/2004 | Knutson |
| 2007/0026371 A1 | 2/2007 | Wood |
| 2008/0222552 A1 | 9/2008 | Batarseh et al. |
| 2011/0039249 A1 | 2/2011 | Packard et al. |
| 2011/0173225 A1 | 7/2011 | Stahl et al. |

(Continued)

*Primary Examiner* — Omkar A Deodhar
(74) *Attorney, Agent, or Firm* — Amarok IP Inc.; Neil W. Henderson

(57) ABSTRACT

Methods and systems for improving resource content mapping for an electronic learning system. The methods can include: receiving, by the electronic learning system, a resource for satisfying at least one learning objective of the one or more learning objectives, the resource comprising a content having a content data convertible into a text data and one or more resource property fields defining at least one characteristic of the resource; sectioning the content data into one or more content portions based on an analysis of at least one of the content data and the one or more resource property fields; and assigning at least one content portion of the one or more content portions to at least one learning objective.

12 Claims, 18 Drawing Sheets

(56) References Cited

U.S. PATENT DOCUMENTS

| | | |
|---|---|---|
| 2012/0276516 A1 | 11/2012 | Teskey et al. |
| 2012/0310961 A1 | 12/2012 | Callison et al. |
| 2013/0021346 A1 | 1/2013 | Terman |
| 2013/0085955 A1 | 4/2013 | Dugas |
| 2013/0311409 A1 | 11/2013 | Ye et al. |
| 2014/0017653 A1 | 1/2014 | Romney et al. |
| 2014/0335497 A1 | 11/2014 | Gal et al. |
| 2014/0363802 A1 | 12/2014 | Hutchinson |
| 2015/0072330 A1 | 3/2015 | Rosenberg |
| 2015/0147742 A1 | 5/2015 | Khalil |
| 2015/0206441 A1 | 7/2015 | Brown |
| 2015/0254214 A1 | 9/2015 | Rosenberg |
| 2015/0325133 A1 | 11/2015 | Gaglani et al. |
| 2015/0339588 A1 | 11/2015 | Cardonha et al. |
| 2016/0019800 A1 | 1/2016 | Rodmell |
| 2016/0163211 A1 | 6/2016 | Piper |
| 2016/0364996 A1 | 12/2016 | Gile |

METHODS AND SYSTEMS FOR IMPROVING RESOURCE CONTENT MAPPING FOR AN ELECTRONIC LEARNING SYSTEM

CROSS-REFERENCE TO RELATED PATENT APPLICATIONS

This application is a continuation of U.S. patent application Ser. No. 17/854,438 filed on Jun. 30, 2022, which is a continuation of U.S. patent application Ser. No. 16/922,664 filed on Jul. 7, 2020, which is a continuation of U.S. patent application Ser. No. 14/729,612 filed on Jun. 3, 2015. The entire of U.S. patent application Ser. No. 17/854,438, U.S. patent application Ser. No. 16/922,664 and U.S. patent application Ser. No. 14/729,612 are incorporated herein by reference for all purposes.

TECHNICAL FIELD

The described embodiments relate to methods and systems associated with improving resource content mapping for an electronic learning system.

INTRODUCTION

Electronic learning (also known as "e-Learning" or "eLearning") generally refers to education or learning where users engage in education related activities using computers and other computing devices. For example, users may enroll or participate in a course or program of study offered by an educational institution (e.g., a college, university or grade school) through a web interface that is accessible over the Internet. Users may receive assignments electronically, participate in group work and projects by collaborating over the Internet, and be graded based on assignments and examinations that are submitted, for example, using an electronic submission tool.

Electronic learning is not limited to use by educational institutions. Electronic learning may be used in other environments, such as government and corporations. For example, employees at a regional branch office of a corporation may use electronic learning to participate in a training course offered by another office, or even a third-party provider. As a result, the employees at the regional branch office can participate in the training course without having to travel to the site providing the training course. Travel time and costs can be reduced and conserved.

In addition to enabling convenient access to electronic learning, electronic learning systems can collect data associated with its usage and adapt the electronic learning based on the collected data. In traditional learning environments, a curriculum is typically static and rarely can the curriculum be adjusted based on individual needs. As a result, teachers in traditional learning environments are unable to determine the effectiveness of the curriculum and are limited in their ability to adapt the curriculum to the different needs of the learners.

Summary of Some Embodiments

The various embodiments described herein generally relate to methods (and associated systems configured to implement the methods) for improving resource content mapping for an electronic learning system.

In accordance with some embodiments, there is provided a method for improving resource content mapping for an electronic learning system. The electronic learning system including a processor and at least one memory in electronic communication with the processor, the at least one memory storing one or more learning objectives. The method can include: receiving, by the electronic learning system, a resource for satisfying at least one learning objective of the one or more learning objectives, the resource including a content having a content data convertible into a text data and one or more resource property fields defining at least one characteristic of the resource; sectioning the content data into one or more content portions based on an analysis of at least one of the content data and the one or more resource property fields; and assigning at least one content portion of the one or more content portions to at least one learning objective.

In some embodiments, sectioning the content data into the one or more content portions based on the analysis of the at least one of the content data and the one or more resource property fields includes: determining whether the one or more resource property fields includes one or more resource structure fields, the one or more resource structure fields defining a content structure of the content data and the content structure including one or more data hierarchy levels; and in response to determining the one or more resource property fields includes the one or more resource structure fields, sectioning the content data into the one or more content portions according to at least one data hierarchy level of the one or more data hierarchy levels.

In some embodiments, assigning the at least one content portion to the at least one learning objective includes: applying a semantic analysis to the at least one content portion and applying the semantic analysis to each learning objective of the one or more learning objectives; based on results of the semantic analysis, assigning a relevance score for the at least one content portion in respect of at least one learning objective of the one or more learning objectives, the relevance score representing an estimated degree of correlation between the at least one content portion and the at least one learning objective; for each learning objective, determining whether the respective relevance score assigned to the at least one content portion at least satisfies a relevance threshold for that learning objective, the relevance threshold being a minimum relevance score required for the at least one content portion to be associated with that learning objective; and in response to determining the relevance score at least satisfies the relevance threshold, assigning the at least one content portion with that learning objective.

In some embodiments, the one or more content portions includes two or more data hierarchy levels.

In some embodiments, the resource includes a video, and receiving the resource for satisfying the at least one learning objective includes transcribing an audio data into the text data.

In some embodiments, the resource includes an image, and receiving the resource for satisfying the at least one learning objective includes applying an electronic character recognition conversion to the image for generating the text data from the image.

In accordance with some embodiments, there is provided an electronic learning system including: a memory for storing one or more learning objectives; and a processor in electronic communication with the memory, the processor operating to: receive a resource for satisfying at least one learning objective of the one or more learning objectives, the resource including a content having a content data convertible into a text data and one or more resource property fields defining at least one characteristic of the resource; section the content data into one or more content portions based on an analysis of at least one of the content data and the one or more resource property fields; and assign at least one content portion of the one or more content portions to at least one learning objective.

In some embodiments, the processor operates to: determine whether the one or more resource property fields includes one or more resource structure fields, the one or more resource structure fields defining a content structure of the content data and the content structure including one or more data hierarchy levels; and in response to determining the one or more resource property fields includes the one or more resource structure fields, section the content data into the one or more content portions according to at least one data hierarchy level of the one or more data hierarchy levels.

In some embodiments, the processor operates to: apply a semantic analysis to the at least one content portion and apply the semantic analysis to each learning objective of the one or more learning objectives; based on results of the semantic analysis, assign a relevance score for the at least one content portion in respect of at least one learning objective of the one or more learning objectives, the relevance score representing an estimated degree of correlation between the at least one content portion and the at least one learning objective; for each learning objective, determine whether the respective relevance score assigned to the at least one content portion at least satisfies a relevance threshold for that learning objective, the relevance threshold being a minimum relevance score required for the at least one content portion to be associated with that learning objective; and in response to determining the relevance score at least satisfies the relevance threshold, assign the at least one content portion with that learning objective.

In some embodiments, the one or more content portions includes two or more data hierarchy levels.

In some embodiments, the resource includes a video, and the processor operates to transcribe an audio data into the text data.

In some embodiments, the resource includes an image, and the processor operates to apply an electronic character recognition conversion to the image for generating the text data from the image.

BRIEF DESCRIPTION OF THE DRAWINGS

Several embodiments will now be described in detail with reference to the drawings, in which.

Figure 1:
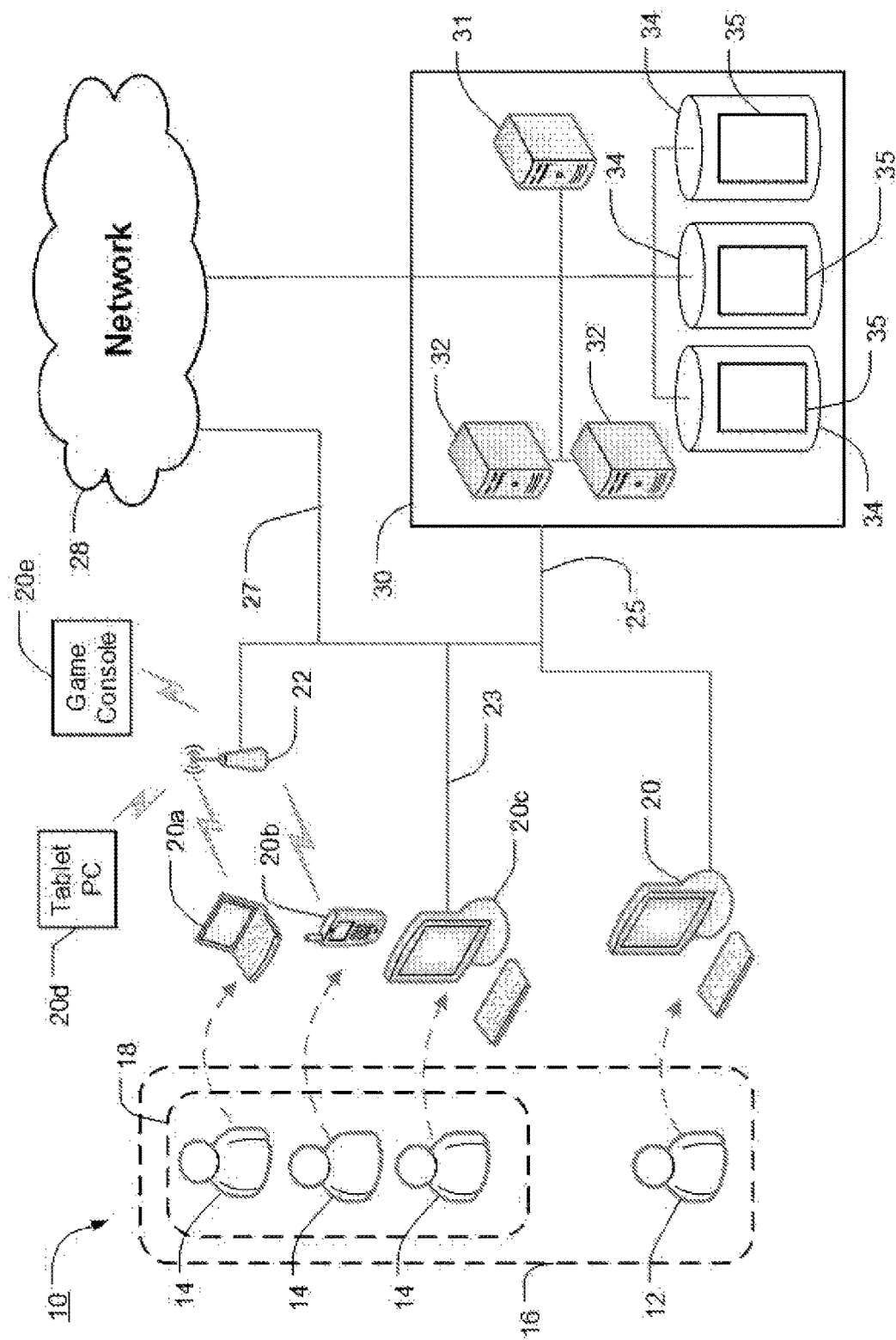
FIG. 1 is a schematic diagram of components interacting with an electronic learning system in accordance with some embodiments.

The drawings, described below, are provided for purposes of illustration, and not of limitation, of the aspects and features of various examples of embodiments described herein.

DESCRIPTION OF SOME EMBODIMENTS

For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described herein in any way, but rather as merely describing the implementation of various embodiments as described.

The embodiments of the systems and methods described herein may be implemented in hardware or software, or a combination of both. In some cases, embodiments may be implemented in one or more computer programs executing on one or more programmable computing devices comprising at least one processor, a data storage component (including volatile memory or non-volatile memory or other data storage elements or a combination thereof) and at least one communication interface.

For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

In some embodiments, each program may be implemented in a high level procedural or object-oriented programming and/or scripting language to communicate with a computer system. However, the programs can be implemented in assembly or machine language, if desired. In any case, the language may be a compiled or interpreted language.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein.

In some embodiments, the systems and methods as described herein may also be implemented as a non-transitory computer-readable storage medium configured with a computer program, wherein the storage medium so configured causes a computer to operate in a specific and predefined manner to perform at least some of the functions as described herein.

Furthermore, the systems, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Some of the embodiments described herein generally relate to methods (and associated systems configured to implement the methods) for providing a learning path for a user of an electronic learning system and in some embodiments, modifying the learning path for the user.

A learning path can include a series of one or more actions in respect of one or more resources that are accessible via the electronic learning system. The series of actions may be ordered in some embodiments. As will be described, the electronic learning system can define the learning path based on a set of learning objectives, and in some embodiments, based also on one or more other factors. Generally, the electronic learning system can operate to define the learning path so that the learning path includes actions ordered in such a way to enable the user to achieve the respective learning objectives.

A learning objective can be a desired achievement. The set of learning objectives can be previously selected by the user, or assigned to a group of individuals (including the user) by a third party (e.g., an employer, a teacher, etc.).

The electronic learning system can collect and manage data associated with its usage. In traditional learning environments, such as a classroom setting, teachers are generally unable to determine the effectiveness of a curriculum while the course is underway. Also, a curriculum is typically quite static and therefore, teachers are rarely equipped to adapt the curriculum to the different needs of the learners.

Unlike traditional learning environments, the electronic learning systems described herein can provide the learning path for the user and adapt the learning path according to data associated with usage of the described systems. Due, at least, to the speed at which the electronic learning systems can operate and the amount of resources and/or data that can be accessible to the electronic learning systems, the electronic learning systems can relatively quickly, or possibly even nearly in real-time, customize the learning path for the relevant users in response to the collected usage data.

Learning paths can be generated based on an estimated degree of correlation between the learning objectives and the one or more resources. In some embodiments, the electronic learning systems described herein can update the learning path based on usage data associated with certain types of resources, such as evaluation resources. An evaluation resource is a resource that involves some degree of interaction between the user and the electronic learning system in order to evaluate a proficiency of the user with one or more learning objectives. When a usage amount of the evaluation resource at least satisfies a predefined threshold, the systems described herein can determine that the collected usage data is sufficient and can then proceed to update the learning path based, at least partially, on that collected usage data.

The electronic learning systems described herein can also modify the learning path initially defined for the user based on response inputs received from the user. Each response input can be associated with at least one learning objective. On receipt of the response inputs, the electronic learning system can evaluate the received response inputs and determine whether the user is proficient with the relevant one or more learning objectives.

In some of the described embodiments, evaluation resources can be dynamically generated in response to triggering actions conducted by the user in respect of the learning path. The electronic learning systems can customize the evaluation resources based on the user's prior interaction with the learning path and/or usage data from other users. The dynamically generated evaluation resources can improve the user's interaction with the learning path. The electronic learning system may also adjust the remainder of the learning path to accommodate the user's progress in the learning path.

Some of the embodiments described herein generally relate to methods (and associated systems configured to implement the methods) for improving resource content mapping for the electronic learning system. Resources can typically include large amount of contents that may be relevant to multiple different learning objectives, or in some cases, only a small portion of the contents in a resource is relevant to a learning objective. Certain resources that contain content convertible to text format can be sectioned into content portions according to the described methods, and accordingly assigned to the various one or more learning objectives.

Referring now to FIG. 1, illustrated therein is a schematic diagram 10 of components interacting with an electronic learning system 30 for providing electronic learning according to some embodiments.

As shown in the schematic diagram 10, one or more users 12, 14 may access the electronic learning system 30 to participate in, create, and consume electronic learning services, including educational content such as courses. In some cases, the electronic learning system 30 may be part of (or associated with) a traditional "bricks and mortar" educational institution (e.g. a grade school, university or college), another entity that provides educational services (e.g. an online university, a company that specializes in offering training courses, an organization that has a training department, etc.), or may be an independent service provider (e.g. for providing individual electronic learning).

It should be understood that a course is not limited to formal courses offered by formal educational institutions. The course may include any form of learning instruction offered by an entity of any type. For example, the course may be a training seminar at a company for a group of employees or a professional certification program (e.g. Project Management Professional™ (PMP), Certified Management Accountants (CMA), etc.) with a number of intended participants.

In some embodiments, one or more educational groups 16 can be defined to include one or more users 12, 14. For example, as shown in FIG. 1, the users 12, 14 may be grouped together in the educational group 16. The educational group 16 can be associated with a particular course (e.g. History 101 or French 254, etc.), for example. The educational group 16 can include different types of users. A first user 12 can be responsible for organizing and/or teaching the course (e.g. developing lectures, preparing assignments, creating educational content, etc.), such as an instructor or a course moderator. The other users 14 can be consumers of the course content, such as students.

In some examples, the users 12, 14 may be associated with more than one educational group 16 (e.g. some users 14 may be enrolled in more than one course, another example user 12 may be a student enrolled in one course and an instructor responsible for teaching another course, a further example user 12 may be responsible for teaching several courses, and so on).

In some examples, educational sub-groups 18 may also be formed. For example, the users 14 shown in FIG. 1 form an educational sub-group 18. The educational sub-group 18 may be formed in relation to a particular project or assignment (e.g. educational sub-group 18 may be a lab group) or based on other criteria. In some embodiments, due to the nature of electronic learning, the users 14 in a particular educational sub-group 18 may not need to meet in person, but may collaborate together using various tools provided by the electronic learning system 30.

In some embodiments, other educational groups 16 and educational sub-groups 18 could include users 14 that share common interests (e.g. interests in a particular sport), that participate in common activities (e.g. users that are members of a choir or a club), and/or have similar attributes (e.g. users that are male, users under twenty-one years of age, etc.).

Communication between the users 12, 14 and the electronic learning system 30 can occur either directly or indirectly using any one or more suitable computing devices. For example, the user 12 may use a computing device 20 having one or more device processors such as a desktop computer that has at least one input device (e.g. a keyboard and a mouse) and at least one output device (e.g. a display screen and speakers).

The computing device 20 can generally be any suitable device for facilitating communication between the users 12, 14 and the electronic learning system 30. For example, the computing device 20 could be wirelessly coupled to an access point 22 (e.g. a wireless router, a cellular communications tower, etc.), such as a laptop 20a, a wirelessly enabled personal data assistant (PDA) or smart phone 20b, a tablet computer 20d, or a game console 20e. The computing device 20 could be coupled to the access point 22 over a wired connection 23, such as a computer terminal 20c.

The computing devices 20 may communicate with the electronic learning system 30 via any suitable communication channels.

The computing devices 20 may be any networked device operable to connect to the network 28. A networked device is a device capable of communicating with other devices through a network such as the network 28. A network device may couple to the network 28 through a wired or wireless connection.

As noted, these computing devices may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these. These computing devices may be handheld and/or wearable by the user.

In some embodiments, these computing devices may be a laptop 20a, or a smartphone device 20b equipped with a network adapter for connecting to the Internet. In some embodiments, the connection request initiated from the computing devices 20a, 20b may be initiated from a web browser and directed at the browser-based communications application on the electronic learning system 30.

For example, the computing devices 20 may communicate with the electronic learning system 30 via the network 28. The network 28 may include a local area network (LAN) (e.g., an intranet) and/or an external network (e.g., the Internet). For example, the computing devices 20 may access the network 28 by using a browser application provided on the computing device 20 to access one or more web pages presented over the Internet via a data connection 27.

The network 28 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between the computing devices 20 and the electronic learning system 30, for example.

In some examples, the electronic learning system 30 may authenticate an identity of one or more of the users 12, 14 prior to granting the user 12, 14 access to the electronic learning system 30. For example, the electronic learning system 30 may require the users 12, 14 to provide identifying information (e.g., a login name and/or a password) in order to gain access to the electronic learning system 30.

In some examples, the electronic learning system 30 may allow certain users 12, 14, such as guest users, access to the electronic learning system 30 without requiring authentication information to be provided by those guest users. Such guest users may be provided with limited access, such as the ability to review one or more components of the course to decide whether they would like to participate in the course but without the ability to post comments or upload electronic files.

In some embodiments, the electronic learning system 30 may communicate with the access point 22 via a data connection 25 established over the LAN. Alternatively, the electronic learning system 30 may communicate with the access point 22 via the Internet or another external data communications network. For example, one user 14 may use the laptop 20a to browse to a webpage (e.g. a course page) that displays elements of the electronic learning system 30.

The electronic learning system 30 can include one or more components for providing electronic learning services. It will be understood that in some embodiments, each of the one or more components may be combined into fewer number of components or may be separated into further components. Furthermore, the one or more components in the electronic learning system 30 may be implemented in software or hardware, or a combination of software and hardware.

For example, the electronic learning system 30 can include one or more processing components, such as computing servers 32. Each computing server 32 can include one or more processor. The processors provided at the computing servers 32 can be referred to as "system processors" while processors provided at computing devices 20 can be referred to as "device processors". The computing servers 32 may be a computing device 20 (e.g. a laptop or personal computer).

It will be understood that although two computing servers 32 are shown in FIG. 1, one or more than two computing servers 32 may be provided. The computing servers 32 may be located locally together, or distributed over a wide geographic area and connected via the network 28.

The system processors may be configured to control the operation of the electronic learning system 30. The system processors can initiate and manage the operations of each of the other components in the electronic learning system 30. The system processor may also determine, based on received data, stored data and/or user preferences, how the electronic learning system 30 may generally operate.

The system processor may be any suitable processors, controllers or digital signal processors that can provide sufficient processing power depending on the configuration, purposes and requirements of the electronic learning system 30. In some embodiments, the system processor can include more than one processor with each processor being configured to perform different dedicated tasks.

In some embodiments, the computing servers 32 can transmit data (e.g. electronic files such as web pages) over the network 28 to the computing devices 20. The data may include electronic files, such as webpages with course information, associated with the electronic learning system 30. Once the data is received at the computing devices 20, the device processors can operate to display the received data.

The electronic learning system 30 may also include one or more data storage components 34 that are in electronic communication with the computing servers 32. The data storage components 34 can include RAM, ROM, one or more hard drives, one or more flash drives or some other suitable data storage elements such as disk drives, etc. The data storage components 34 may include one or more databases, such as a relational database (e.g., a SQL database), for example.

The data storage components 34 can store various data associated with the operation of the electronic learning system 30. For example, course data 35, such as data related to a course's framework, educational content, and/or records of assessments, may be stored at the data storage components 34. The data storage components 34 may also store user data, which includes information associated with the users 12, 14. The user data may include a user profile for each user 12, 14, for example. The user profile may include personal information (e.g., name, gender, age, birthdate, contact information, interests, hobbies, etc.), authentication information to the electronic learning system 30 (e.g., login identifier and password) and educational information (e.g., which courses that user is enrolled in, the user type, course content preferences, etc.). The data storage components 34 may also store data associated with the learning path, such as learning objectives and learning path data associated with the learning path.

The data storage components 34 can store authorization criteria that define the actions that may be taken by certain users 12, 14 with respect to the various educational contents provided by the electronic learning system 30. The authorization criteria can define different security levels for different user types. For example, there can be a security level for an instructing user who is responsible for developing an educational course, teaching it, and assessing work product from the student users for that course. The security level for those instructing users, therefore, can include, at least, full editing permissions to associated course content and access to various components for evaluating the students in the relevant courses.

In some embodiments, some of the authorization criteria may be pre-defined. For example, the authorization criteria can be defined by administrators so that the authorization criteria are consistent for the electronic learning system 30, as a whole. In some further embodiments, the electronic learning system 30 may allow certain users, such as instructors, to vary the pre-defined authorization criteria for certain course contents.

The electronic learning system 30 can also include one or more backup servers 31. The backup server can store a duplicate of some or all of the data 35 stored on the data storage components 34. The backup server 31 may be desirable for disaster recovery (e.g. to prevent data loss in the event of an event such as a fire, flooding, or theft). It should be understood that although only one backup server 31 is shown in FIG. 1, one or more backup servers 31 may be provided in the electronic learning system 30. The one or more backup servers 31 can also be provided at the same geographical location as the electronic learning system 30, or one or more different geographical locations.

The electronic learning system 30 can include other components for providing the electronic learning services. For example, the electronic learning system 30 can include a management component that allows users 12, 14 to add and/or drop courses and a communication component that enables communication between the users 12, 14 (e.g., a chat software, etc.). The communication component may also enable the electronic learning system 30 to benefit from tools provided by third-party vendors. Other example components will be described with reference to FIG. 2.

Figure 2:
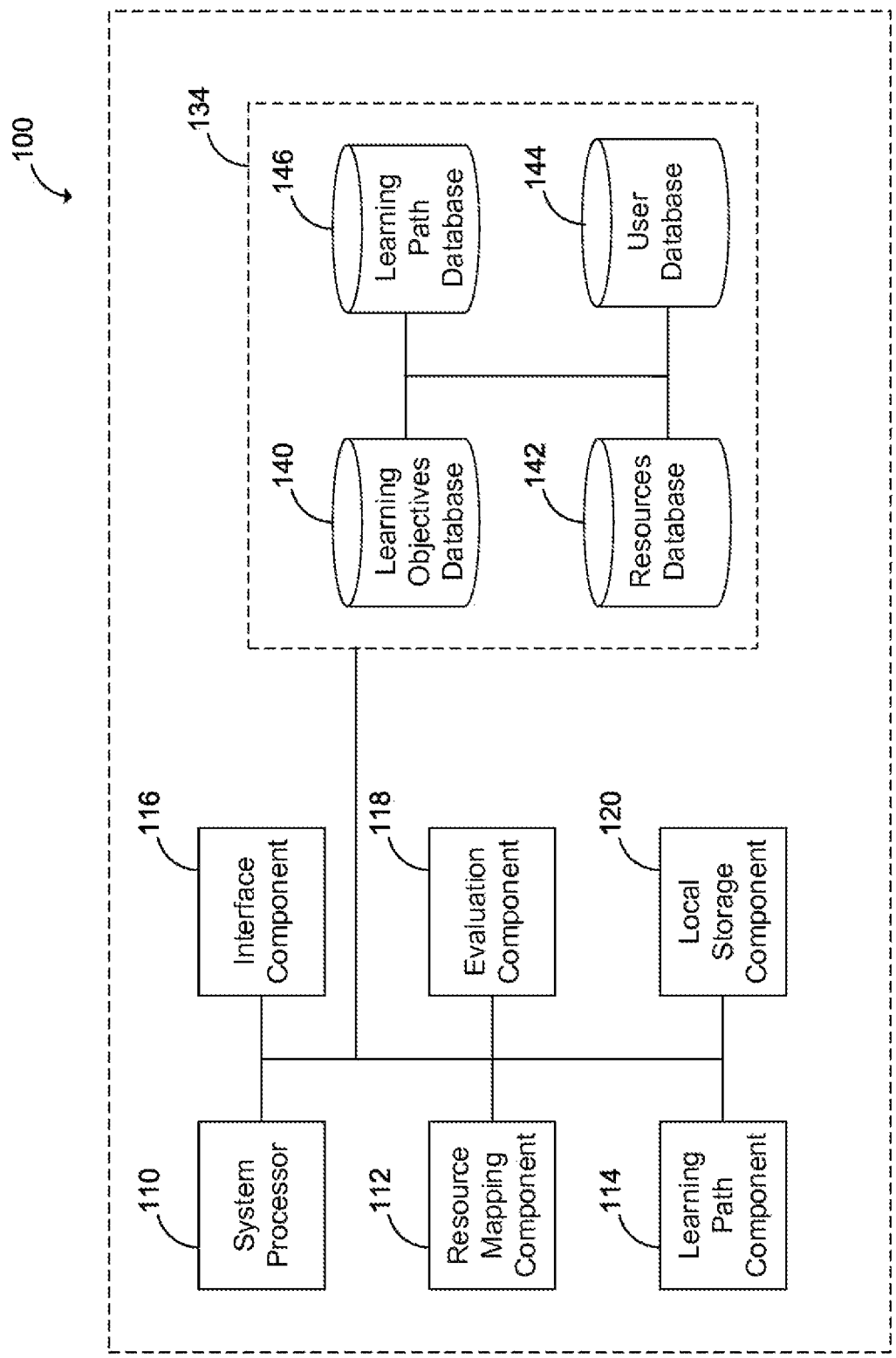
FIG. 2 is a block diagram of some components that may be implemented in the electronic learning system in accordance with an example embodiment.

Referring now to FIG. 2, which is a block diagram 100 of some components that may be implemented in the electronic learning system 30 according to some embodiments. In the example of FIG. 2, the various illustrated components are provided at one of the computing servers 32.

As shown in FIG. 2, the computing server 32 may include a system processor 110, a resource mapping component 112, a learning path component 114, an interface component 116, an evaluation component 118, a local storage component 120 and a data storage component 134.

Each of the system processor 110, the resource mapping component 112, the learning path component 114, the interface component 116, the evaluation component 118, the local storage component 120 and the data storage component 134 can be in electronic communication with one another. It should be noted that in some embodiments, the system processor 110, the resource mapping component 112, the learning path component 114, the interface component 116, the evaluation component 118, the local storage component 120 and the data storage component 134 may be combined or may be separated into further components. Furthermore, the system processor 110, the resource mapping component 112, the learning path component 114, the interface component 116, the evaluation component 118, the local storage component 120 and the data storage component 134 may be implemented using software, hardware or a combination of both software and hardware.

Generally, the system processor 110 controls the operation of the computing server 32 and, as a result, various operations of the electronic learning system 30. For example, the system processor 110 may initiate the resource mapping component 112 for improving the association of resources to the learning objectives stored in the data storage component 134. In some embodiments, the system processor 110 may be configured to initiate the learning path component 114 to generate a learning path for a user and/or adapt the learning path in accordance with the methods described herein. The system processor 110 may also, based on user response inputs received via the interface component 116, initiate the evaluation component 118 to determine a competence level of the user in respect of at least one learning objective, as will be described. It will be understood that the system processor 110 is not limited to the described operations and that the described operations are provided only for the purpose of illustration.

The interface component 116 may be any interface that enables the computing server 32 to communicate with the other computing servers 32, backup servers 31 and data storage components 34 within the electronic learning system 30. The interface component 116 may also include any interface that enables the computing server 32 to communicate with third-party systems. In some embodiments, the interface component 116 can include at least one of a serial port, a parallel port or a USB port. The interface component 116 may also include at least one of an Internet, Local Area Network (LAN), Ethernet, Firewire, modem or digital subscriber line connection. Various combinations of these elements may be incorporated within the interface component 116.

In some embodiments, the interface component 116 may receive input from the computing devices 20 via various input components, such as a mouse, a keyboard, a touch screen, a thumbwheel, a track-pad, a track-ball, a card-reader, voice recognition software and the like depending on the requirements and implementation of the electronic learning system 30.

The local storage component 120 may be provided at the computing server 32 for temporary storage of data associated with various operations of the system processor 110. The local storage component 120 may receive data from and/or transmit data to the data storage component 134.

The data storage component 134 can include one or more databases. For example, as shown in FIG. 2, the data storage component 134 can include a learning objectives database 140, a resources database 142, a user database 144, and a learning path database 146. Although each of the databases 140, 142, 144 and 146 are shown to be separate databases, it will be understood that two or more of the databases 140, 142, 144 and 146 may be provided together as fewer databases, or one or more of the databases 140, 142, 144 and 146 may be further separated into a greater number of databases.

The learning objectives database 140 can store data associated with the learning objectives. In some embodiments, the electronic learning system 30 can store one or more predefined learning objectives in the learning objectives database 140. To facilitate the process of defining the learning objectives, the electronic learning system 30 can provide one or more of the predefined learning objectives from which the relevant learning objectives can be selected. In some embodiments, the learning objectives database 140 can store the learning objectives received and assigned to a learner.

Figure 3:
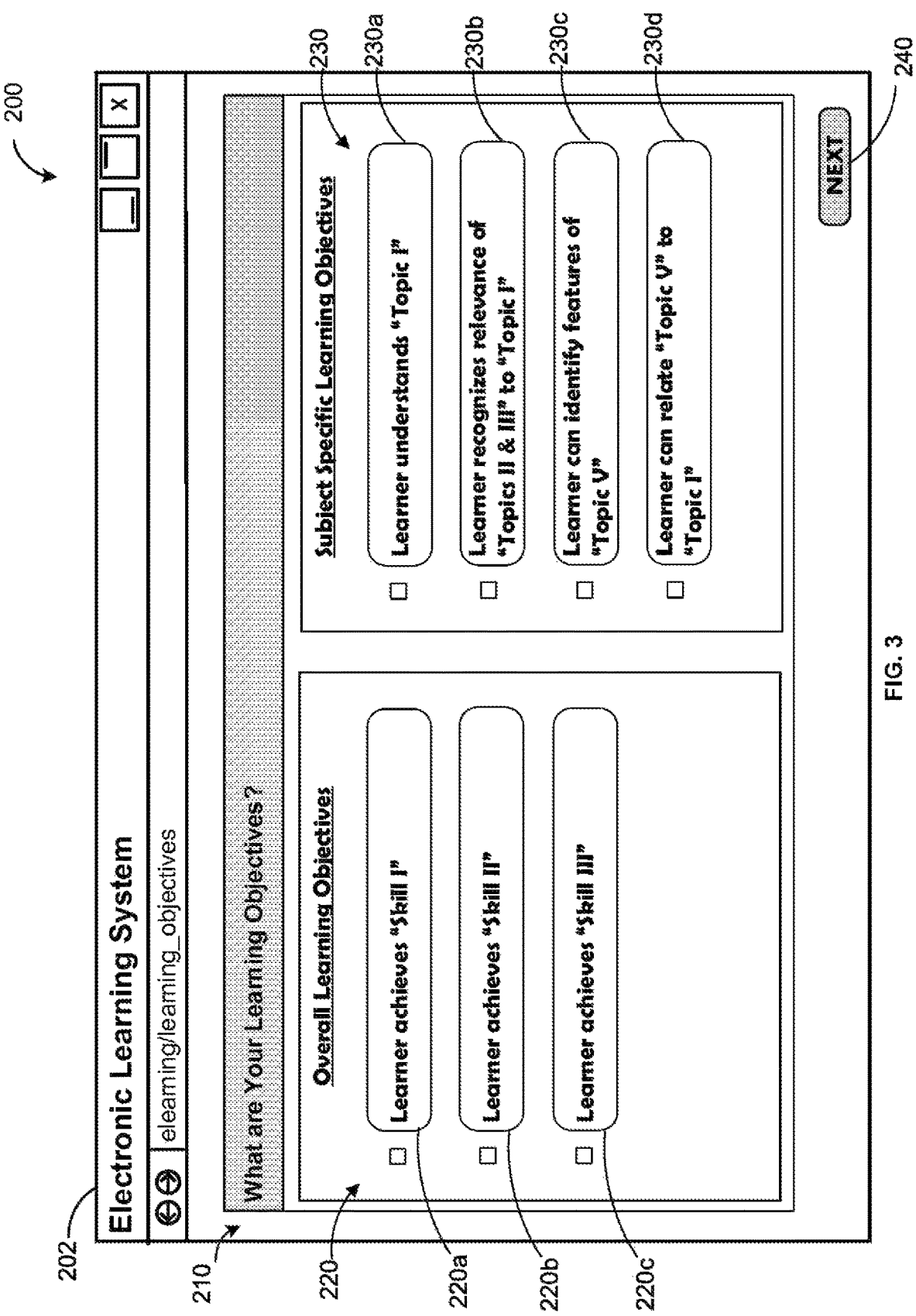
FIG. 3 is a screenshot of an example user interface for receiving example learning objectives by the electronic learning system in accordance with an example embodiment.

Reference is now made to FIG. 3, which is a screenshot 200 of an example user interface 210 for receiving example learning objectives 220, 230 by the electronic learning system 30. The user interface 210 is provided via a browser application 202 in this example.

As shown in FIG. 3, learning objectives can have different levels of breadth. Broader learning objectives, such as overall learning objectives 220, can be directed to an achievement that can be applied to other subjects. Subject specific learning objectives 230 are more narrow learning objectives than the overall learning objectives 220. In some embodiments, achieving one or more subject specific learning objectives 230 can lead to the achievement of an overall learning objective 220. It will be understood that learning objectives may not be divided into different levels of breadth, in some embodiments.

In FIG. 3, the overall learning objectives 220 include three different overall learning objectives 220, namely 220*a*, 220*b* and 220*c*. Each of the overall learning objectives 220*a*, 220*b* and 220*c* is directed at a different desired skill to be achieved by the learner, namely "Skill I", "Skill II" and "Skill III", respectively. The subject specific learning objectives 230 include four different subject specific learning objectives, namely 230*a*, 230*b*, 230*c* and 230*d*. The first subject specific learning objective 230*a* requires that the learner understands a specific topic, namely "Topic I"; the second subject specific learning objective 230*b* requires that the learner recognizes the relevance of "Topics II and III" to "Topic I"; the third subject specific learning objective 230c requires that the learner be able to identify features of another subject, "Topic V"; and the fourth subject specific learning objective 230d requires that the learner be able to relate "Topic V" to "Topic I". It will be understood that the described learning objectives 220, 230 are merely for illustrative purposes and learning objectives are not limited in any way to the learning objectives 220, 230 shown in FIG. 3.

Figure 4:
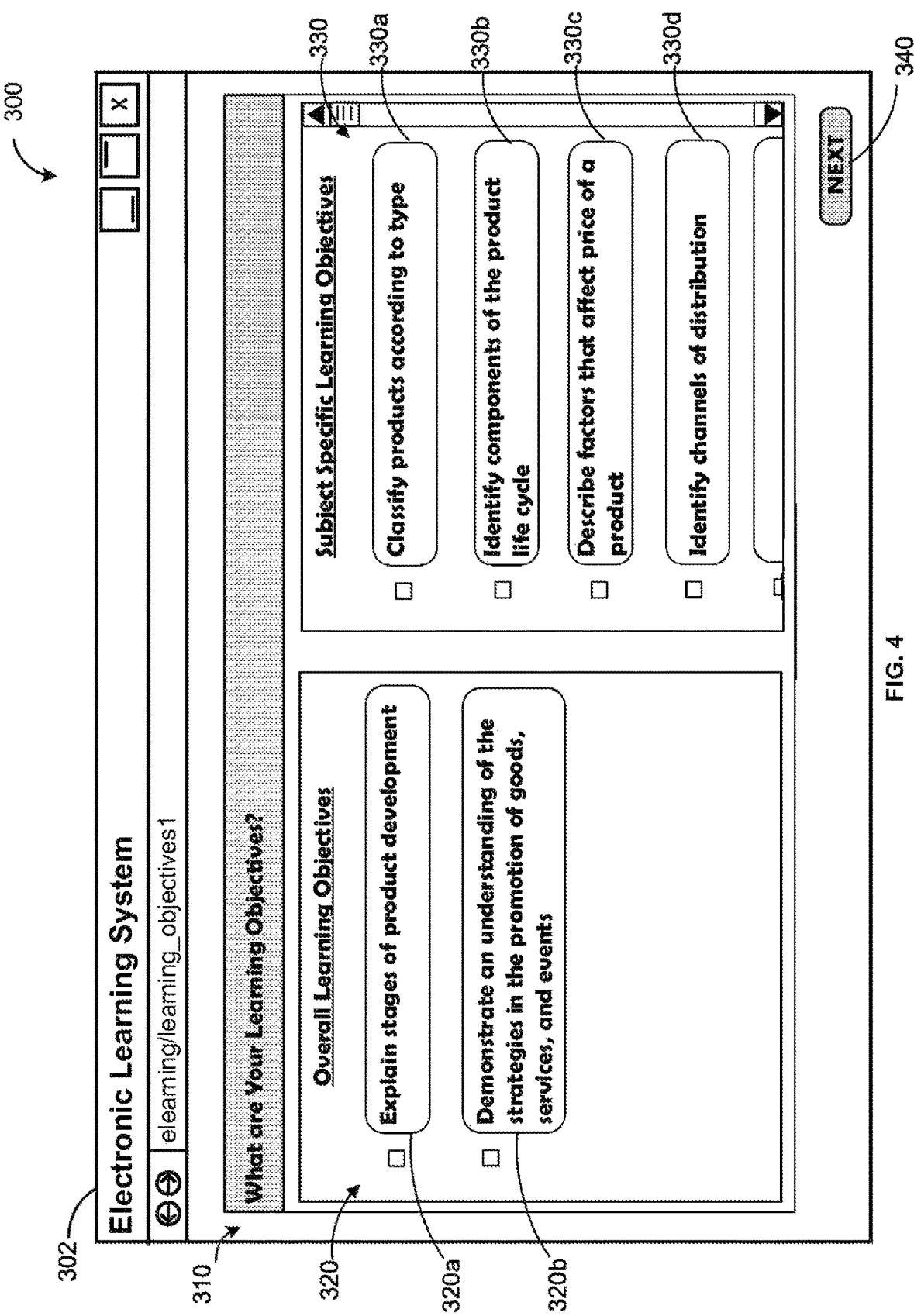
FIG. 4 is a screenshot of an example user interface for receiving example learning objectives by the electronic learning system in accordance with another example embodiment.

FIG. 4 is a screenshot 300 of another example user interface 310 for receiving example learning objectives 320, 330 by the electronic learning system 30. The user interface 310 is provided via a browser application 302 in this example. Similar to the example learning objectives 220, 230 shown in FIG. 3, the learning objectives 320, 330 in FIG. 4 also include overall learning objectives 320 and subject specific learning objectives 330.

The learning objectives 320, 330 shown in FIG. 4 are directed to developing an understanding of the fundamentals of marketing. The overall learning objectives 320 include a first overall learning objective 320a (the learner is required to be able to explain the stages of product development), and a second overall learning objective 320b (the learner is able to demonstrate an understanding of the strategies in the promotion of goods, services and events). The subject specific learning objectives 330 include, at least, a first subject specific learning objective 330a (the learner is required to be able to classify products according to type), a second subject specific learning objective 330b (the learner is required to be able to identify components of the product life cycle), a third subject specific learning objective 330c (the learner is required to describe factors that affect price of a product), and a fourth subject specific learning objective 330d (the learner is required to identify channels of distribution). For ease of exposition, the other subject specific learning objectives 330 are not shown in FIG. 4.

From FIG. 4, it can be seen that one or more of the subject specific learning objectives 330 is relevant to at least one of the overall learning objectives 320. For example, the subject specific learning objectives 330 associated with products, such as 330a and 330b, are relevant to the first overall learning objectives 320a, while the subject specific learning objective 330 associated with the strategies in the promotion of goods, such as 330c, is relevant to the second overall learning objective 320b.

Returning to FIG. 2, the resources database 142 can store the resources, and associated resource data, that can be accessible by the electronic learning system 30 for inclusion into the learning path by the user. Generally, various types of resources can be provided by the electronic learning system 30. For example, the resources can include text data, video data, image data, and one or more combinations thereof.

In some embodiments, the resource can include content with content data that is convertible into a text data format. The resource can also include one or more resource property fields that define at least one characteristic of the resource. For example, a resource property field can indicate a content structure of the content data. The content structure can indicate a number of data hierarchy levels that may be present in the content. As will be described, the resource property fields can be used by the resource mapping component 112 for improving the mapping of the resources with the learning objectives stored in the learning objectives database 140.

The user database 144 can store user data for the various users of the electronic learning system 30. For example, the user data can include a user profile for each user 12, 14. The user profile may include personal information (e.g., name, gender, age, birthdate, contact information, interests, hobbies, etc.), authentication information to the electronic learning system 30 (e.g., login identifier and password) and educational information (e.g., which courses that user is enrolled in, the user type, course content preferences, etc.). It will be understood that the described user data is merely for illustrative purposes and that the user data stored in the user database 144 is not limited to the described examples.

The learning path database 146 can store path data associated with the learning paths defined by the learning path component 114. For example, the path data can include identifiers corresponding to the resources selected to be included into the learning path based on the received learning objectives, user identifiers corresponding to the users with access to the learning path (e.g., learners who follow the learning path and teachers who define the learning path, etc.), and/or usage data associated with the interaction with the learning path by the respective users. The learning path component 114 can include the software and data associated with the various methods for providing the learning path for a user and/or modifying the learning path, as described herein. Example embodiments will now be described with reference to, at least, FIGS. 8A to 14.

Figure 5:
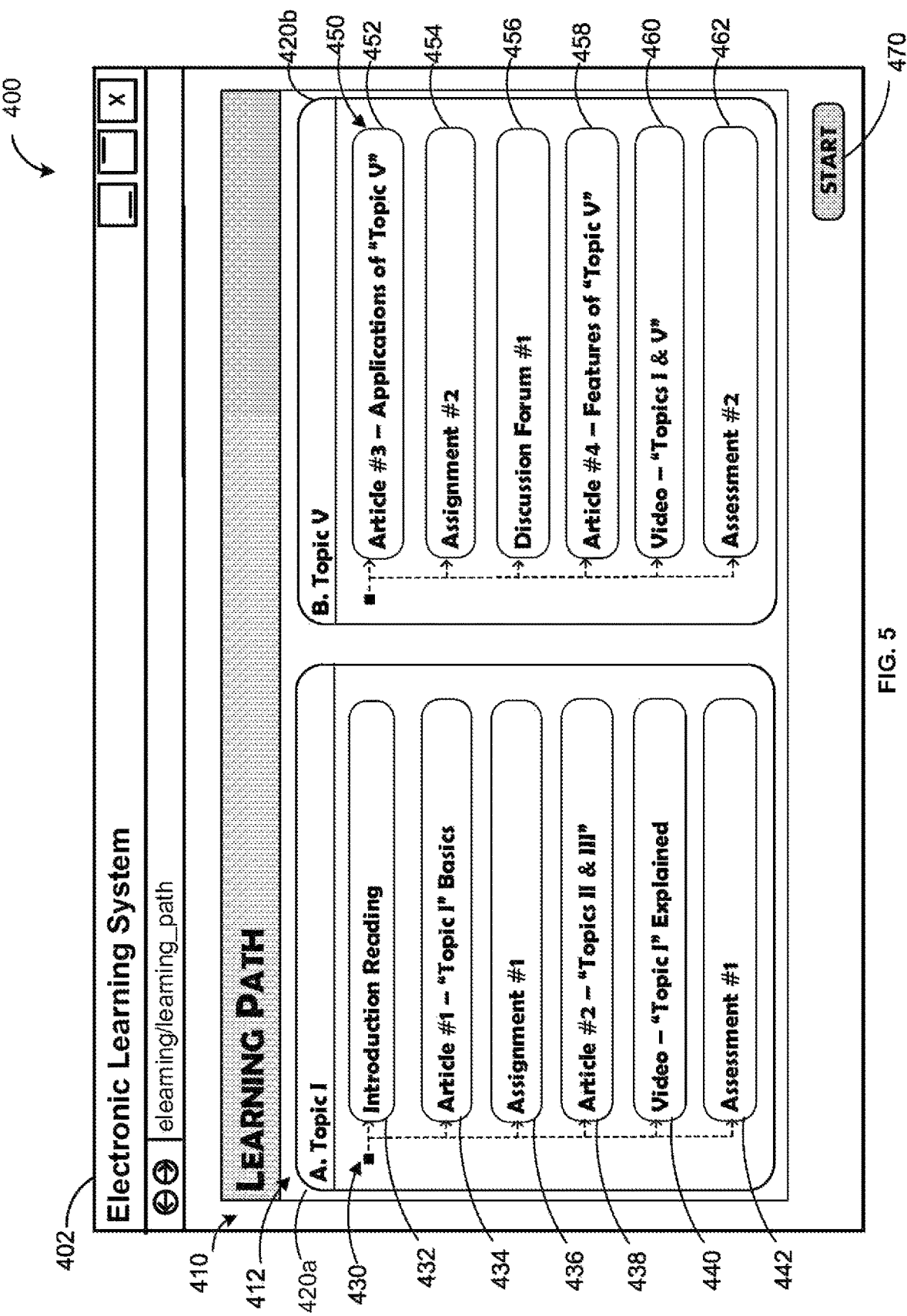
FIG. 5 is a screenshot of an example user interface showing an example learning path generated based on the example learning objectives received via the user interface in FIG. 3, in accordance with an example embodiment.

Reference will now be made to FIG. 5. FIG. 5 is a screenshot of an example user interface 400 showing an example learning path generated based on the example learning objectives 220, 230 received via the user interface 210 in FIG. 3.

When the learning objectives 220, 230 are received by the electronic learning system 30, the system processor 110 can initiate the learning path component 114 to generate a learning path, such as learning path 412 shown in FIG. 5. The learning path component 114 can generate the learning path 412 based on the learning objectives 220, 230 received via the user interface 210 by identifying, from the learning objectives database 140 and the resources database 142, the resources associated with the learning objectives 220, 230.

As generally shown in FIG. 5, the learning path 412 includes two groups of actions, namely a first series of actions 430 associated with a first group 420a ("Topic I") and a second series of actions 450 associated with a second group 420b ("Topic II"). Each of the first and second sets of actions 430 and 450 includes different actions in respect of various different resources. In the first series of actions 430, the learning path component 114 has included an action 432 to read the introduction, an action 434 to read Article #1, an action 436 to complete Assignment #1, an action 438 to read Article #2, an action 440 to watch a video on Topic I and an action 442 to complete an Assessment #1. In the second series of actions 450, the learning path component 114 has included an action 452 to read Article #3, an action 454 to complete Assignment #2, an action 456 to participate in the Discussion Forum #1, an action 458 to read Article #4, an action 460 to watch a video on Topics I and V, and an action 462 to complete Assessment #2.

Figure 6:
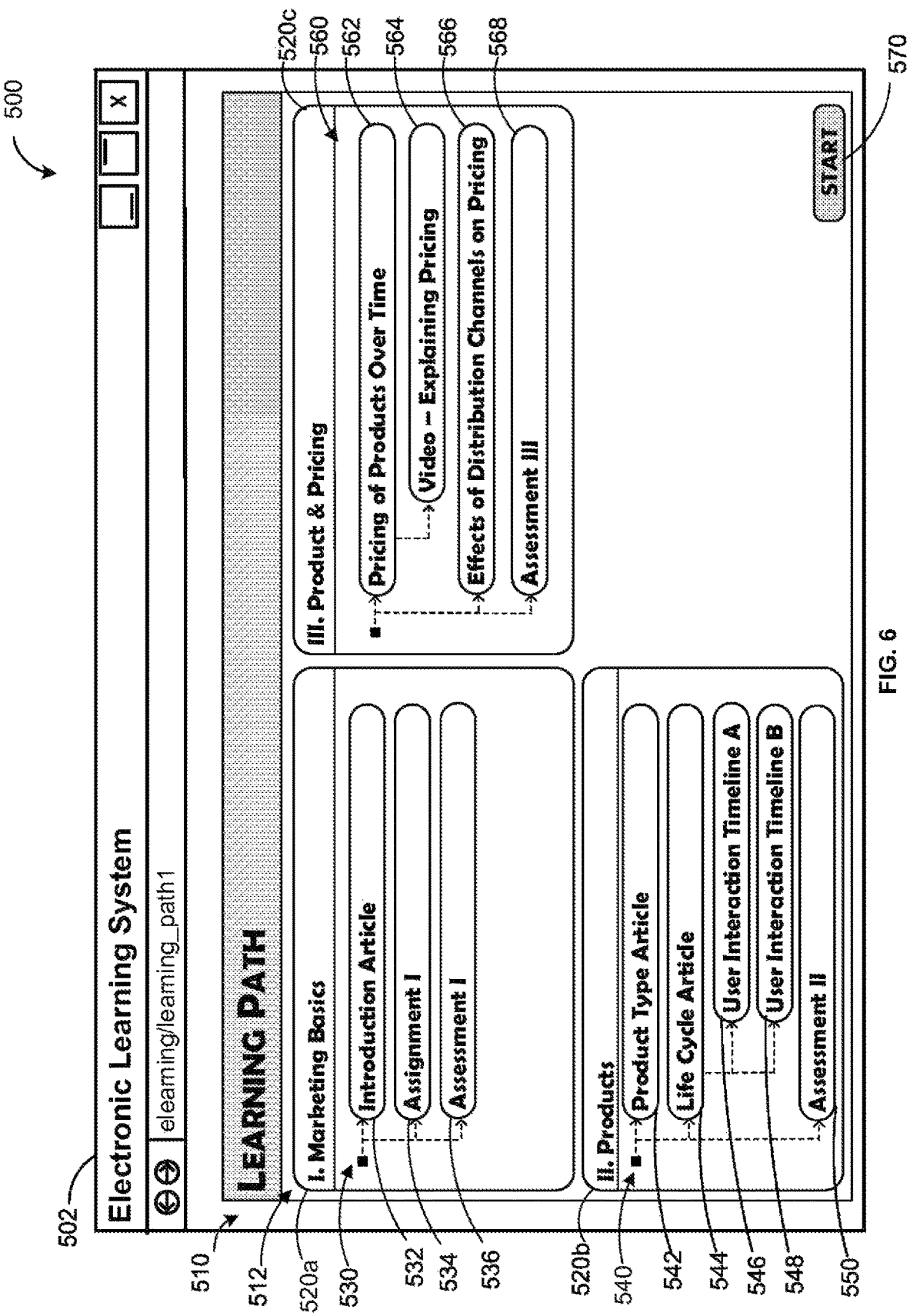
FIG. 6 is a screenshot of an example user interface showing an example learning path generated based on the example learning objectives received via the user interface in FIG. 4, in accordance with an example embodiment.

Reference will now be made to FIG. 6. FIG. 6 is a screenshot of an example user interface 500 showing an example learning path generated based on the example learning objectives 320, 330 received via the user interface 310 in FIG. 4. The learning path component 114 can generate the learning path 512 based on the learning objectives 320, 330 received via the user interface 310 by identifying, from the learning objectives database 140 and the resources database 142, the resources associated with the learning objectives 320, 330.

As generally shown in FIG. 6, the learning path 512 includes three groups of actions, namely a first series of actions 530 associated with a first group 520a ("Marketing Basics"), a second series of actions 540 associated with a second group 520b ("Products") and a third series of actions 560 associated with a third group 520c ("Product & Pricing"). Each of the first, second and third sets of actions 530, 540 and 560 includes actions in respect of various different resources.

In the first series of actions 530, the learning path component 114 has included an action 532 to read an introduction article, an action 534 to complete Assignment I and an action 536 to complete Assessment I. In the second series of actions 540, the learning path component 114 has included an action 542 to read an article regarding product types, an action 544 to read an article regarding life cycle, an action 546 to use an interaction component, an action 548 to use another interaction component, and an action 550 to complete Assessment II. In the third series of actions 560, the learning path component 114 has included an action 562 to read an article regarding pricing of products, an action 564 to watch a video regarding pricing, an action to read an article regarding the effects of distribution channels on pricing 566 and an action 568 to complete Assessment III.

Referring again to FIG. 2, the resource mapping component 112 can include the software and data associated with the various methods for improving resource content mapping for the electronic learning system 30, as described herein. For example, when a resource is received via the interface component 116, the system processor 110 can initiate operation of the resource mapping component 112 to map the received resource. Example embodiments will be described with reference to FIG. 7.

The evaluation component 118 can be operated by the system processor 110 to determine a competence level of the user in respect of at least one learning objective. For example, the evaluation component 118 can generate the dynamic evaluation resources as generated with the methods and systems described herein. In some embodiments, the evaluation component 118 and the learning path component 114 can operate together so that the learning path component 114 can modify the learning path based, at least, on the determinations by the evaluation component 118 in respect of the competence level of the user. It will be understood that, in some embodiments, the evaluation component 118 may be provided as part of the learning path component 114. Example embodiments will be described with reference to, at least, FIGS. 10 to 17.

Figure 7:
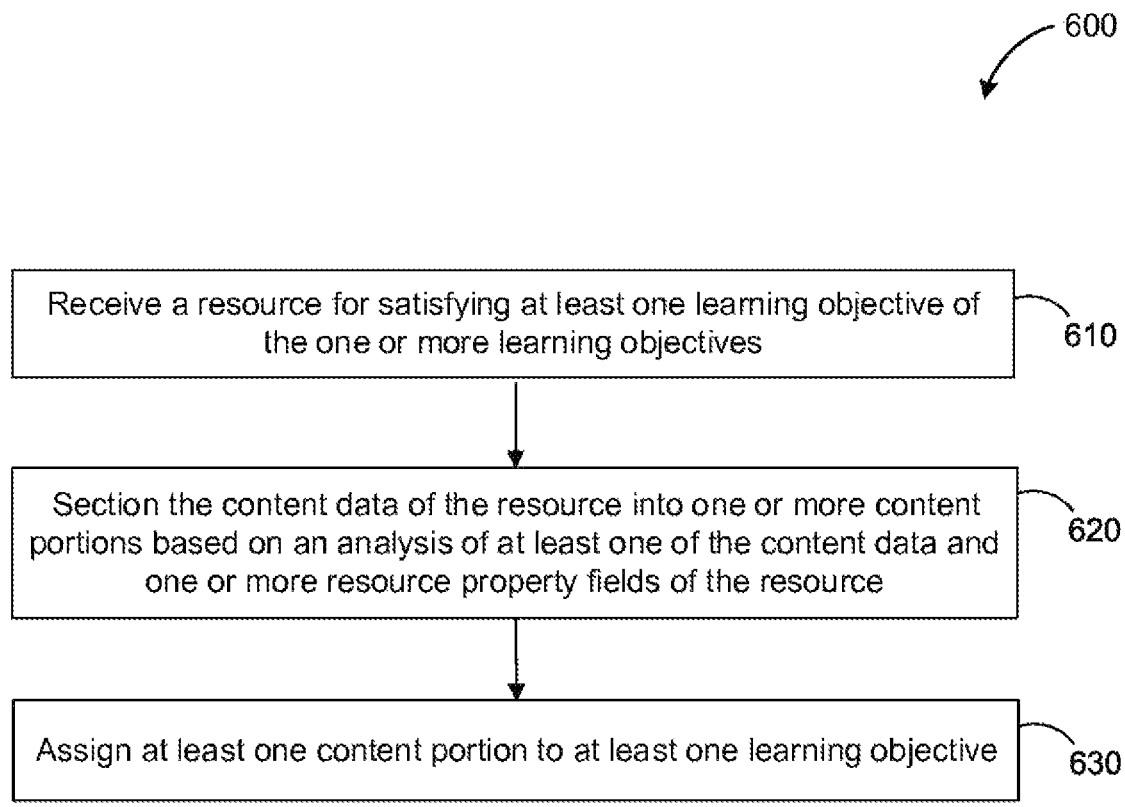
FIG. 7 is a flowchart diagram of an example method for improving resource content mapping for the electronic learning system, in accordance with an example embodiment.

Referring now to FIG. 7, a flowchart diagram illustrating an example method 600 for improving resource content mapping for the electronic learning system 30 is shown.

As described, the resources database 142 can store various different resources to be accessible by the electronic learning system 30 for inclusion into the learning paths provided by the learning path component 114. The scope and degree of relevance of each resource can vary. For example, a resource can include content data that may be relevant to more than one learning objective, while in some other cases, only a small amount of a resource (e.g., one content portion) is relevant to a learning objective. In order to improve the correlation between the learning objective and the resource, and to facilitate access to the relevant portions of the resource, the resource mapping component 112 can process each resource according to the methods described with respect to FIG. 7.

At 610, the electronic learning system 30 receives a resource for satisfying at least one learning objective of the one or more learning objectives.

The electronic learning system 30 can receive one or more resources from a third party (e.g., a content provider, etc.) and/or a user (e.g., learner, teacher, etc.) so that the resource can be included in the learning paths provided by the learning path component 114 if the resource is determined to be relevant to one or more learning objectives stored in the learning objectives database 140.

The resource can include content with content data that is convertible into a text data format, such as an article (e.g., a Wikipedia™ article) or an electronic book ("e-book"). In some embodiments, the resource can include video data and/or image data. When the received resource includes video data, the system processor 110 can determine whether the audio data associated with the video data is available or can be transcribed into text data. When the received resource includes image data, the system processor 110 can determine whether any portion of the image data can be converted into text data. For example, the system processor 110 can apply an electronic character recognition conversion to the image data for generating the text data from the image data.

The resource received by the electronic learning system 30 may include metadata in respect of the content data. The metadata can define various aspects of the resource, such as, but not limited to, a length of the resource, an identity of the author, the time required for preparing the resource and/or a format of the resource. For example, the metadata can include resource structure fields that define a content structure of the content data. The content data can be organized in one or more data hierarchy levels and the content structure can indicate the number of data hierarchy levels in which the content data is organized.

For example, a Wikipedia article is generally organized by headings. The headings can be organized into different data hierarchy levels, such as one or more subheadings. Similarly, an electronic book can be organized into various data hierarchy levels, such as a section, a chapter and/or headings.

At 620, the resource mapping component 112 sections the content data into one or more content portions based on an analysis of at least one of the content data and the one or more resource property fields.

The content data provided within each resource may be organized into one or more content portions. The content portions may correspond to data hierarchy levels, or may correspond to a formatting of the resource (e.g., paragraph structure). The resource mapping component 112 can section the content data into the content portions based on the organization of the content data. By sectioning the content data, the scope of each resulting content portion can be narrowed so that the resource mapping component 112 can assign that content portion to a learning objective with an acceptable degree of correlation.

In some embodiments, the resource mapping component 112 may identify the content portions within the content data based on the text data associated with the content data. For example, the text data can include certain terminologies associated with hierarchy levels, such as "section", "chapter", "part", etc., and/or numbers representing the content portions.

In embodiments when the resource mapping component 112 determines that the metadata includes the resource structure fields, the resource mapping component 112 can section the content data according to at least one data hierarchy level defined by the resource structure fields. For a Wikipedia article, the resource mapping component 112 can determine from the resource structure fields associated with the Wikipedia article that the Wikipedia article is organized into three headings with each heading being further divided into two subheadings. The resource mapping component 112 may section the Wikipedia article into content portions that each correspond to the various subheadings.

In some embodiments, a content portion can include two or more data hierarchy levels. The resource mapping component 112, therefore, may not section the content data according to the lowest data hierarchy level. For example, for a content data with three different data hierarchy levels, the resource mapping component 112 may determine that the overall length of the content data is relatively short and therefore, sectioning the content data according to the top data hierarchy level may be sufficient so that the content of the resulting content portions may include two data hierarchy levels.

At 630, the resource mapping component 112 assigns at least one content portion to at least one learning objective.

As noted, it may be possible that only some of the received resource is relevant to the learning objectives stored in the learning objectives database 140, or a content portion is relevant to multiple learning objectives. The resource mapping component 112 can analyze each of the content portions to identify a relevant learning objective.

To determine whether a content portion can be assigned to any learning objectives, the resource mapping component 112 can apply a semantic analysis to that content portion as well as to each learning objective in the learning objectives database 140. In some embodiments, a semantic analysis component can be operated by the system processor 110 to conduct the semantic analysis on the content portion and/or the learning objective.

The semantic analysis can involve a comparison of the language used in the contents to be compared. For example, the semantic analysis can involve a comparison of the language in the content portion with the language of each learning objective to determine whether the content portion is relevant to the learning objective. From the semantic analysis of the content portion and the learning objective, the resource mapping component 112 can assign a relevance score to indicate an estimated degree of correlation of the content portion with the learning objective. The relevance score may be a numerical value.

Each learning objective can be associated with a relevance threshold value. The relevance threshold value can be a minimum relevance score required for a content portion to be associated with that learning objective. The relevance threshold value may be a numerical value. The relevance threshold value may be a default value set by the electronic learning system 30 or predefined by a provider and/or a user of the electronic learning system 30 in some embodiments. The relevance threshold value can be stored in association with the learning objective in the learning objectives database 140.

The resource mapping component 112 can then compare the relevance score with the relevance threshold value of the learning objective at issue. When the resource mapping component 112 determines that the relevance score at least satisfies the relevance threshold value, the resource mapping component 112 can assign the content portion to that learning objective since the estimated degree of correlation of the content portion exceeds the minimum required degree of correlation. However, when the resource mapping component 112 determines that the relevance score does not satisfy the relevance threshold value, the resource mapping component 112 can determine that the content portion is not relevant to the learning objective and will not assign that content portion to the learning objective.

To assign the content portion with the corresponding learning objective, the resource mapping component 112 may store a reference to the content portion in association with that learning objective in the learning objectives database 140. For example, when a resource is an electronic book and the resource mapping component 112 determines that a certain content portion within the electronic book is to be assigned to a learning objective, the resource mapping component 112 can associate that learning objective with an identifier corresponding to the electronic book and the relevant page range of the content portion. When an action within a learning path involves accessing that content portion within the electronic book, the electronic learning system 30 can provide access directly to the identified relevant page range instead of to the electronic book as a whole.

Although FIG. 7 involves assigning one or more content portions to relevant learning objectives based on, at least, the analysis applied to the content portion and the learning objectives, there are embodiments described herein which can involve resources that are not sectioned and are instead, assigned to learning objectives in their entirety. It will be understood that the methods described herein, unless specifically stated otherwise, can involve resources that are sectioned and resources that are not sectioned.

Each learning path includes a series of actions in respect of one or more resources. As described with reference to FIG. 6, the learning path component 114 can generate learning paths based on, at least, the learning objectives 320, 330. The learning path component 114 can identify resources, or, in some embodiments, content portions, that are relevant to the learning objectives 320, 330. The learning path component 114 can identify the resources based on data stored in at least one of the learning objectives database 140 and the resources database 142.

In some embodiments, the learning path component 114 can also provide the learning path based on other data, such as data associated with usage of the electronic learning system 30 and/or user data (e.g., user preferences, etc.).

For example, for a user, the learning path component 114 can provide the learning path 412, 512 based on the user preference data stored in the user database 144 for that user. The user preference data can include a preference in the content type to be included in the learning path, such as text, video, image, etc. The learning path component 114 can provide the learning path 412 by assigning a greater priority to the preferred content types. As a result, the learning path component 114 can facilitate the learning of the user since not all users learn in the same manner-some users may be a visual learner, some users may be more textual learners, and other users may be more practical learners who require application of the materials.

An example method of providing the learning path will now be described with reference to FIGS. 8A and 8B.

Figure 8A:
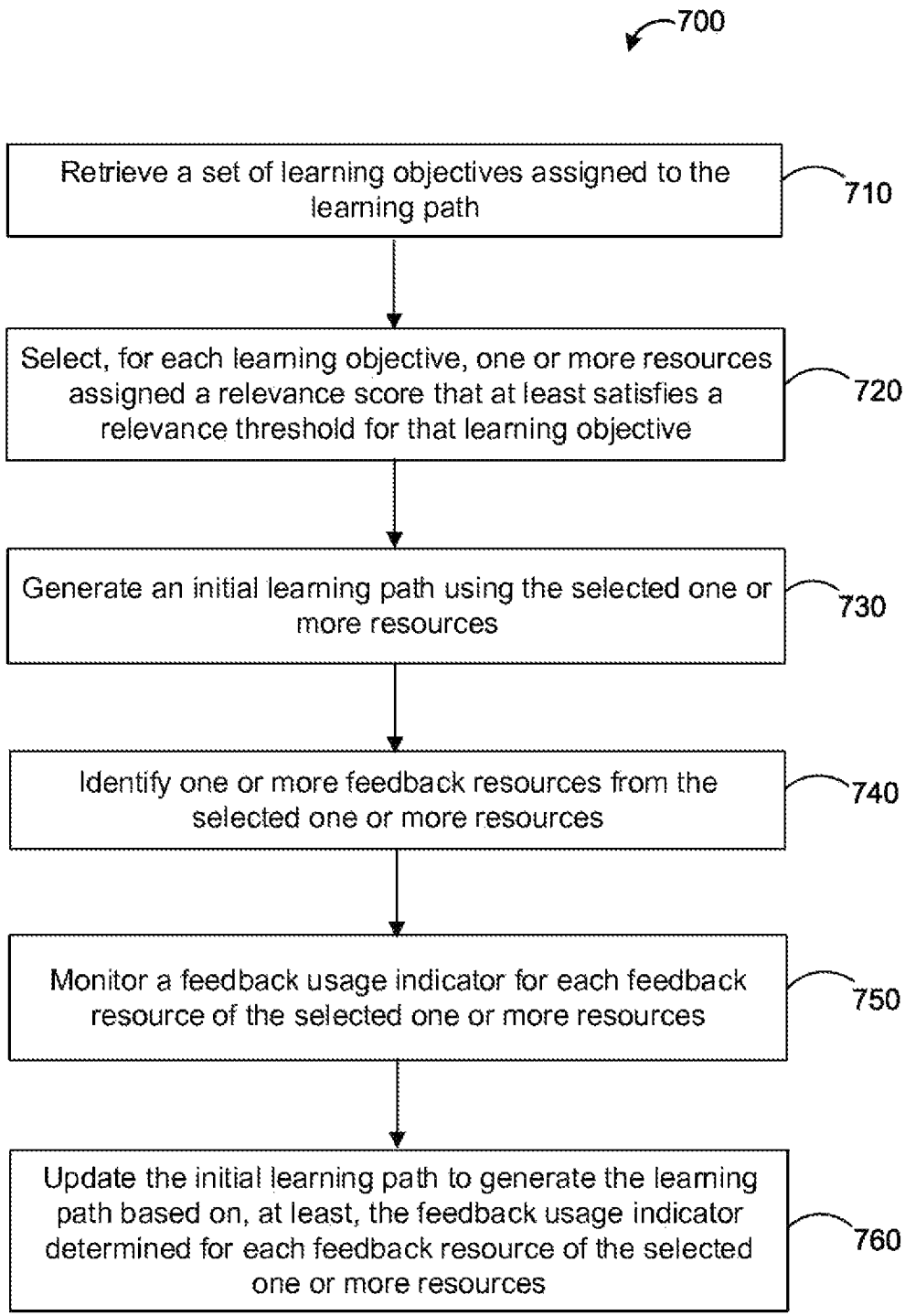
FIG. 8A is a flowchart diagram of an example method for providing a learning path for the electronic learning system, in accordance with an example embodiment.
Figure 8B:
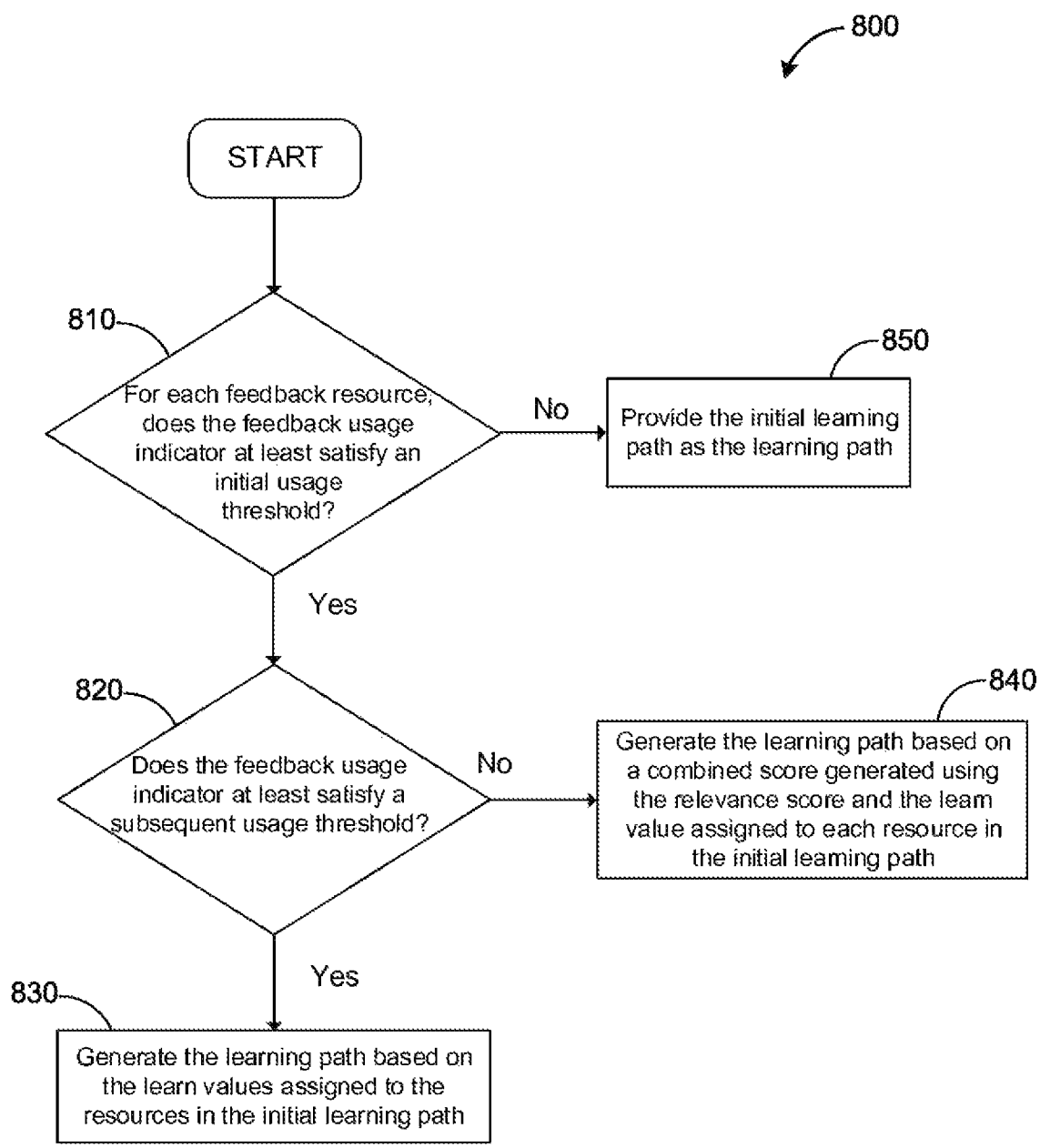
FIG. 8B is a flowchart diagram of an example method for updating an initial learning path for the electronic learning system, in accordance with an example embodiment.

Referring now to FIG. 8A, a flowchart diagram illustrating an example method 700 for providing a learning path 512 for the electronic learning system 30 is shown. To illustrate the method 700, reference will be made simultaneously to FIGS. 6 and 9.

At 710, the learning path component 114 retrieves a set of learning objectives 320, 330 assigned to the learning path 512 for the user.

The set of learning objectives 320, 330 may be previously selected by the user, or assigned to a group of individuals (including the user) by a third party (e.g., an employer, a teacher, etc.). As described with reference to FIG. 4, the set of learning objectives 320, 330 can be received via the user interface 310 and stored in the learning objectives database 140 in association with the user. The learning path component 114 can then retrieve the set of learning objectives 320, 330 from the learning objectives database 140 for generating the learning path 512 for the user.

At 720, for each learning objective of the set of learning objectives 320, 330, the learning path component 114 selects one or more resources assigned the relevance score that at least satisfies the relevance threshold for that learning objective.

When the learning path component 114 selects the resources for the learning objectives 320, 330, the learning path component 114 cannot rely on any usage data from the learning path database 146 since the initial learning path 512 has not previously been provided to any other user and therefore, no interaction with the initial learning path 512 has occurred. As a result, the learning path component 114 can select the resources based on estimated correlations between the resources and the learning objectives 320, 330.

Similar to 630 of FIG. 7 when the resource mapping component 112 applies the semantic analysis to the content portion and the learning objectives to determine whether to assign the content portion to that learning objective, the learning path component 114 can select the resources based on whether the relevance score assigned to the resource at least satisfies the relevance threshold assigned to the learning objectives 320, 330 retrieved. The learning path component 114 can determine the relevance score by conducting a semantic analysis of the learning objective and the content data of the resource. As described, the relevance score generally indicates an estimated degree of correlation of the resource with the learning objective.

When the learning path component 114 determines that the relevance score of a resource at least satisfies the relevance threshold of a learning objective 320, 330, the learning path component 114 can select that resource for the learning path 512.

At 730, the learning path component 114 generates an initial learning path 512 using the selected one or more resources.

As shown in FIG. 6, the sets of actions 530, 540 and 560 include actions in respect of resources that are associated with a relevance score that at least satisfies the relevance threshold of the learning objectives 320, 330 retrieved. The selected resources are resources that the learning path component 114 estimates to have a high degree of correlation with the retrieved set of learning objectives 320, 330.

At 740, the system processor 110 identifies one or more evaluation resources from the selected resources.

An evaluation resource is a resource that involves some interaction between the user and the electronic learning system 30 in order to evaluate a proficiency of the user with at least a subset of learning objectives of the set of learning objectives 320, 330. Example evaluation resources can include, but are not limited to, assignments, projects, and assessments (e.g., exams, etc.). For example, in the initial learning path 512 shown in FIG. 6, the example evaluation resources include the resources associated with the actions 534 and 536 ("Assignment I" and "Assessment I", respectively), the action 550 ("Assessment II") and the action 568 ("Assessment III") respectively.

Each evaluation resource can include one or more questions related to a subset of the set of learning objectives 320, 330 in order to evaluate the proficiency of the user with that subset of learning objectives 320, 330. For example, the evaluation resource associated with the action 550 ("Assessment II") corresponds to the second group 520b, which is related to the subject specific learning objectives 330a and 330b, and the overall learning objective 320a, and the evaluation resource associated with the action 568 ("Assessment III") corresponds to the third group 520c, which is related to the third subject specific learning objective 330c, and the overall learning objective 320b.

At 750, the system processor 110 monitors a feedback usage indicator for each evaluation resource.

The feedback usage indicator can generally represent an amount of user interaction with that evaluation resource. The feedback usage indicator can be represented as a numerical value, in some embodiments. The feedback usage indicator can be stored in the learning path database 146, in some embodiments.

With each use of the evaluation resource in the learning path 512, the corresponding feedback usage indicator increases in value and the electronic learning system 30 can also collect usage data related to those interactions by the users with the evaluation resources.

At 760, the learning path component 114 updates the initial learning path 512 to generate a learning path based on, at least, the feedback usage indicator determined for each evaluation resource.

From the interactions with the learning path 512 by the one or more users and, in particular, with the evaluation resources, the electronic learning system 30 can obtain usage data indicative of a system learn value of the resources selected at 720. The system learn value for the resources in the learning path can represent a likelihood that a particular resource will assist the users in achieving the corresponding learning objective. That is, the system learn value can represent an extent of user data the electronic learning system has obtained in respect of the resource. The system learn value may be a numerical value corresponding to a probability of that particular resource to assist the users in achieving the learning objective.

The electronic learning system 30 can assign a system learn value to each resource selected at 720 in response to each time a user completes a corresponding evaluation resource. When an evaluation resource receives more than one system learn value (e.g., the evaluation resource is used more than once), the electronic learning system 30 may assign the system learn value as an average or a sum of the multiple system learn values received after each use of that evaluation resource, or select the highest or lowest of each of the system learn values. The electronic learning system 30 may track each of the system learn values received in the learning path database 140.

Figure 9:
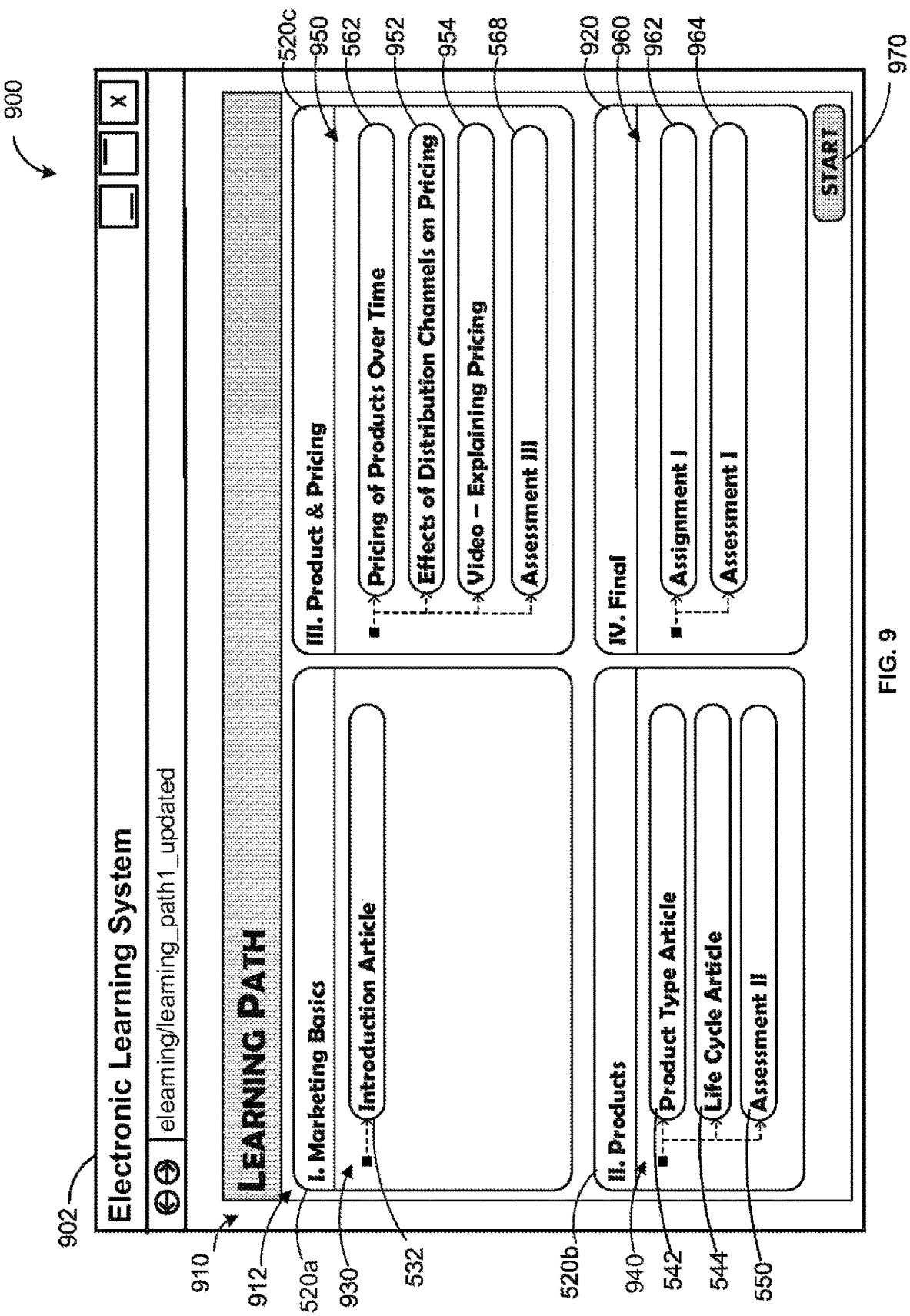
FIG. 9 is a screenshot of an example user interface showing a modified version of the learning path shown in FIG. 6, in accordance with an example embodiment.

Generally, the learning path component 114 can update the initial learning path 512 based on the system learn value assigned to each resource in the initial learning path 512. Reference will now be made to FIG. 6 and FIG. 9. FIG. 9 is a screenshot 900 of an example user interface 910 showing an updated version of the initial learning path 512 shown in FIG. 6, or the learning path 912.

The learning path component 114 can, in some embodiments, generate the learning path 912 by rearranging an order in which the actions associated with the resources are presented in the initial learning path 512. In one example, the actions associated with the resources can be rearranged according to the respective system learn values assigned to each resource in a decreasing numerical sequence so that those actions associated with resources assigned a higher learn order appears first in the learning path 912 with the actions associated with resources assigned a lower learn order following thereafter.

For example, as shown in FIG. 9, several actions within the first series of actions 530 and the third series of actions 560 in the learning path 512 of FIG. 6 are now rearranged in the learning path 912.

Briefly, the learning path 912 now includes a first series of actions 930 associated with the first group 520a ("Marketing Basics"), a second series of actions 940 associated with the second group 520b ("Products"), a third series of actions 950 associated with the third group 520c ("Product & Pricing"), and a fourth series of actions 960 associated with the fourth group 920 ("Final"). Each of the first, second, third and fourth sets of actions 930, 940, 950, and 960 includes actions in respect of various different resources.

In comparison with the first series of actions 530 in FIG. 6, the first series of actions 930 in the learning path 912 includes only the action 532. The learning path component 114, based on the system learn values assigned to the resources, namely Assignment I and Assessment I, has rearranged the corresponding actions 534 and 536 as actions 962 and 964, respectively, within the fourth series of actions 960. For the embodiment shown in FIG. 9, the learning path component 114 can determine that the system learn values assigned to the resources associated with the actions 534 and 536 are lower than the system learn values assigned to the other resources within the initial learning path 512. The learning path component 114, therefore, rearranged the actions 534 and 536 to appear at the end of the learning path 912.

The third series of actions 950 includes the actions 564 and 566 in a reversed order, namely as actions 952 and 954, respectively. Similar to the rearrangement of the actions 534 and 536, the learning path component 114 can rearrange actions 564 and 566 in response to determining that the system learn value assigned to the resource associated with the action 564 is less than the system learn value assigned to the resource associated with the action 566.

In some embodiments, the learning path component 114 can generate the learning path by removing at least one resource from the initial learning path 512. For example, the learning path component 114 may include in the learning path resources with a system learn value that at least satisfies a learn value threshold. The learn value threshold can be a system learn value required for the resource to be retained in the learning path. The learning path component 114 can then update the initial learning path 512 by determining whether the system learn value assigned to each resource is less than the learn value threshold and if the system learn value is determined to be less than the learn value threshold, the learning path component can remove the action associated with that resource from the initial learning path 512.

In some embodiments, if the system learn value is determined to be less than the learn value threshold, the learning path component can add a different action to the initial learning path 512. The learning path component 114 may, in some embodiments, update the initial learning path 512 by removing the action associated with that resource and adding the different action to the initial learning path 512.

For example, in comparing FIG. 6 with FIG. 9, the actions 546 and 548 have been removed from the second series of actions 540 in FIG. 6. The second series of actions 940 in the learning path 912 now only includes the actions 542, 544 and 550. The learning path component 114 may have removed the actions 546 and 548 in response to determining that the system learn values assigned to the resources corresponding to the actions 546 and 548 do not satisfy the system learn value threshold, and therefore, those resources do not sufficiently contribute to the learning of the users to justify being included in the learning path 912.

To benefit from as much usage data as is reasonable so that the learning path component 114 can update the initial learning path 512 with a reliable system learn value, the learning path component 114 may, in some embodiments, update the initial learning path 512 when the feedback usage indicator reaches certain predefined thresholds. As will be described with reference to FIG. 8B, which is a flowchart diagram illustrating an example method 800 for updating the initial learning path 512, the learning path component 114 may update the initial learning path 512 differently depending on the predefined threshold that is met.

At 810, the learning path component 114 determines, for each evaluation resource, whether the feedback usage indicator at least satisfies an initial usage threshold.

The initial usage threshold can be a minimum amount of usage of an evaluation resource in order for the learning path component 114 to update the initial learning path 512 based at least partially on the system learn values assigned to the resources selected at 720.

If the learning path component 114 determines that the feedback usage indicator does not satisfy the initial usage threshold, the learning path component 114 proceeds to 850. At 850, the learning path component 114 provides the initial learning path 512 as the learning path 912 since the amount of use of the evaluation resource is not sufficient for updating the initial learning path 512 and therefore, the learning path component 114 retains the initial learning path 512.

If the learning path component 114 determines that the feedback usage indicator at least satisfies the initial usage threshold at 810, the learning path component 114 can proceed to 820.

It will be understood that, in some embodiments, when the learning path component 114 determines, at 810, that the feedback usage indicator at least satisfies the initial usage threshold, the learning path component 114 can proceed directly to 840 without determining whether the feedback usage indicator at least satisfies a subsequent usage threshold.

At 820, the learning path component 114 determines whether the feedback usage indicator at least satisfies the subsequent usage threshold.

The subsequent usage threshold is generally greater in value than the initial usage threshold. The subsequent usage threshold can be a minimum amount of usage of an evaluation resource in order for the learning path component 114 to update the initial learning path 512 based entirely on the system learn values assigned to the resources selected at 720. When the learning path component 114 determines that the feedback usage indicator at least satisfies the subsequent usage threshold, the usage data associated with the initial learning path 512 can be considered sufficient so that the resulting system learn values are reliable.

If, at 820, the learning path component 114 determines that the feedback usage indicator at least satisfies the subsequent usage threshold, the learning path component 114 can proceed to 830. At 830, the learning path component 114 generates the learning path 912 based on the system learn values assigned to the resources selected at 720.

If the learning path component 114 determines, at 820, that the feedback usage indicator does not satisfy the subsequent usage threshold, the learning path component 114 can proceed to 840. At 840, the learning path component 114 can generate the learning path 912 based on a combined score generated using the relevance score and the system learn value assigned to each resource selected at 720.

In some embodiments, the learning path component 114 can generate the combined score by applying a first weight to the relevance score and a second weight to the system learn value. The combined score may be a sum of the weighted relevance score and the weighted system learn value. The first weight and the second weight may, in some embodiments, each be numerical values that, together, sum to one.

As described with reference to FIGS. 8A to 11, the electronic learning system 30 can generate the initial learning path 512 based on estimated correlations between the received learning objectives 320, 330. The electronic learning system 30 can then, in accordance to the various described methods, proceed to update the initial learning path 512 in response to the collected usage data to generate the learning path 912.

The electronic learning system 30 may, in some embodiments, modify the learning path for individual users in response to certain feedback inputs received prior to the user progressing through the learning path 512 or even while the users progress through the learning path 512. By modifying the learning path 512 according to the needs and/or preferences of the individual users, the electronic learning system 30 can adapt the learning path 512 to the users and, consequently, further enhance the learning experience of each user. Example methods for modifying the learning path 512 will now be described with reference to at least FIGS. 10 to 14.

Figure 10:
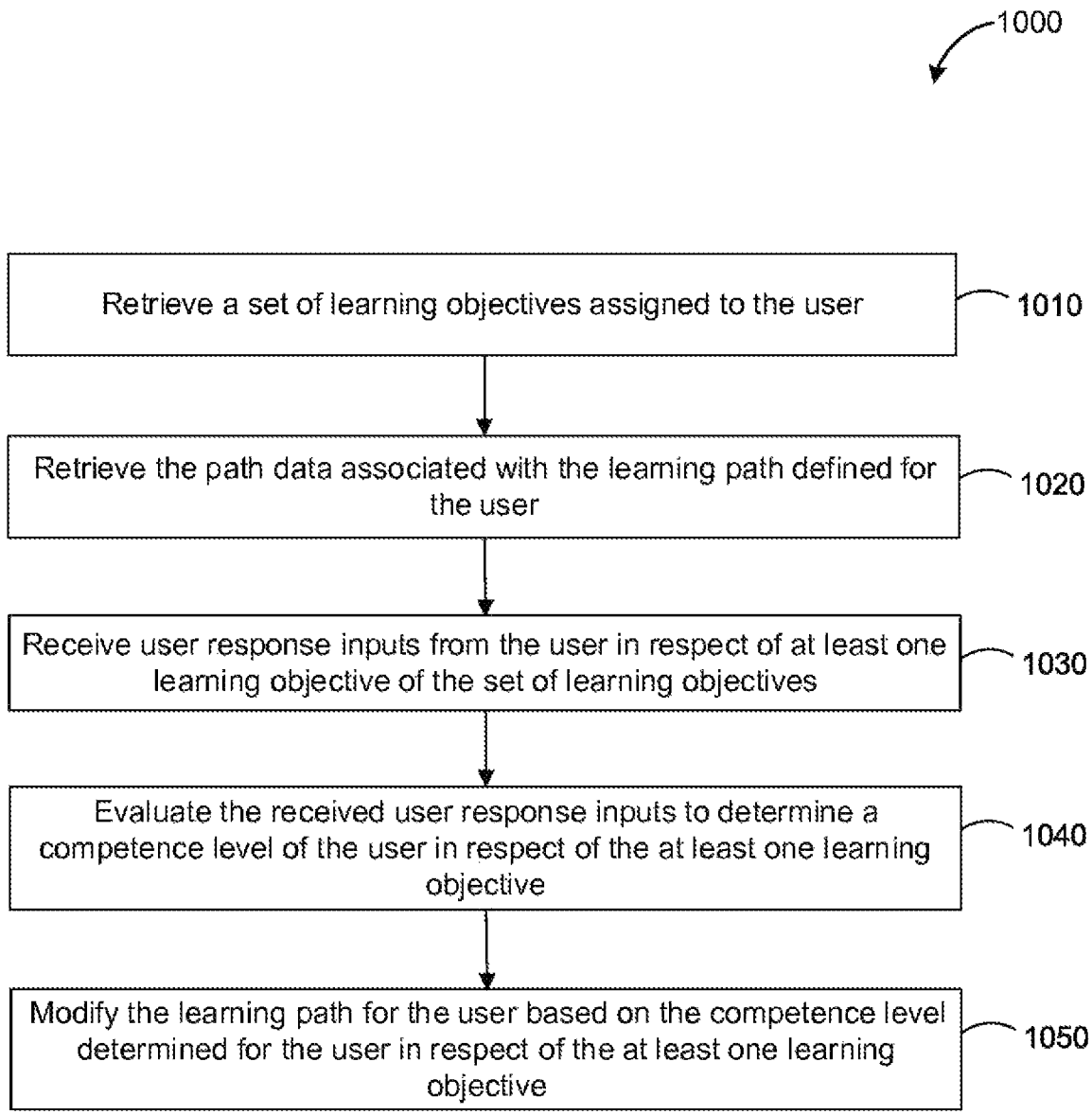
FIG. 10 is a flowchart diagram of an example method for modifying a learning path for the electronic learning system, in accordance with an example embodiment.

Referring now to FIG. 10, a flowchart diagram illustrating an example method 1000 for modifying the learning path 512 for the electronic learning system 30 is shown. To illustrate the method 1000, reference will be made simultaneously to FIGS. 4, 6, and 11 to 14.

At 1010, the learning path component 114 retrieves a set of learning objectives 320, 330 assigned to the user.

As described with respect to 710 of FIG. 8A, the learning path component 114 can retrieve the set of learning objectives 320, 330 from the learning objectives database 140 for the user. The set of learning objectives 320, 330 may be previously selected by the user, or assigned to a group of individuals (including the user) by a third party (e.g., an employer, a teacher, etc.).

At 1020, the learning path component 114 retrieves the path data associated with the learning path 512 defined for the user.

The path data, as described, can be stored in the learning path database 146. In some embodiments, the path data can be stored in one or more other storage components. Generally, the path data includes data associated with the learning paths defined by the learning path component 114. The path data can include, but is not limited to, identifiers corresponding to the resources selected to be included into the learning path 512, user identifiers corresponding to the users with access to the learning path 512, and/or usage data associated with the interaction with the learning path 512 by the respective users.

At 1030, the electronic learning system 30 receives one or more user response inputs from the user in respect of at least one learning objective of the set of learning objectives 320, 330.

User response inputs may be received via the interface component 116. The electronic learning system 30 can receive the user response inputs in respect of the set of learning objectives 320, 330 in various forms.

For example, the user response inputs may include interaction by the user with the various evaluation resources included in the learning path 512. The evaluation resources, as described with reference to FIG. 6, typically include one or more questions related to a subset of learning objectives from the set of learning objectives 320, 330 in order to evaluate the proficiency of the user with that subset of learning objectives 320, 330.

In some embodiments, the electronic learning system 30 may provide an evaluation tool specifically for receiving the user response inputs in respect of the set of learning objectives 320, 330. The evaluation tool can be a pretest for determining whether the user is proficient with any one or more of the learning objectives 320, 330.

Figure 11:
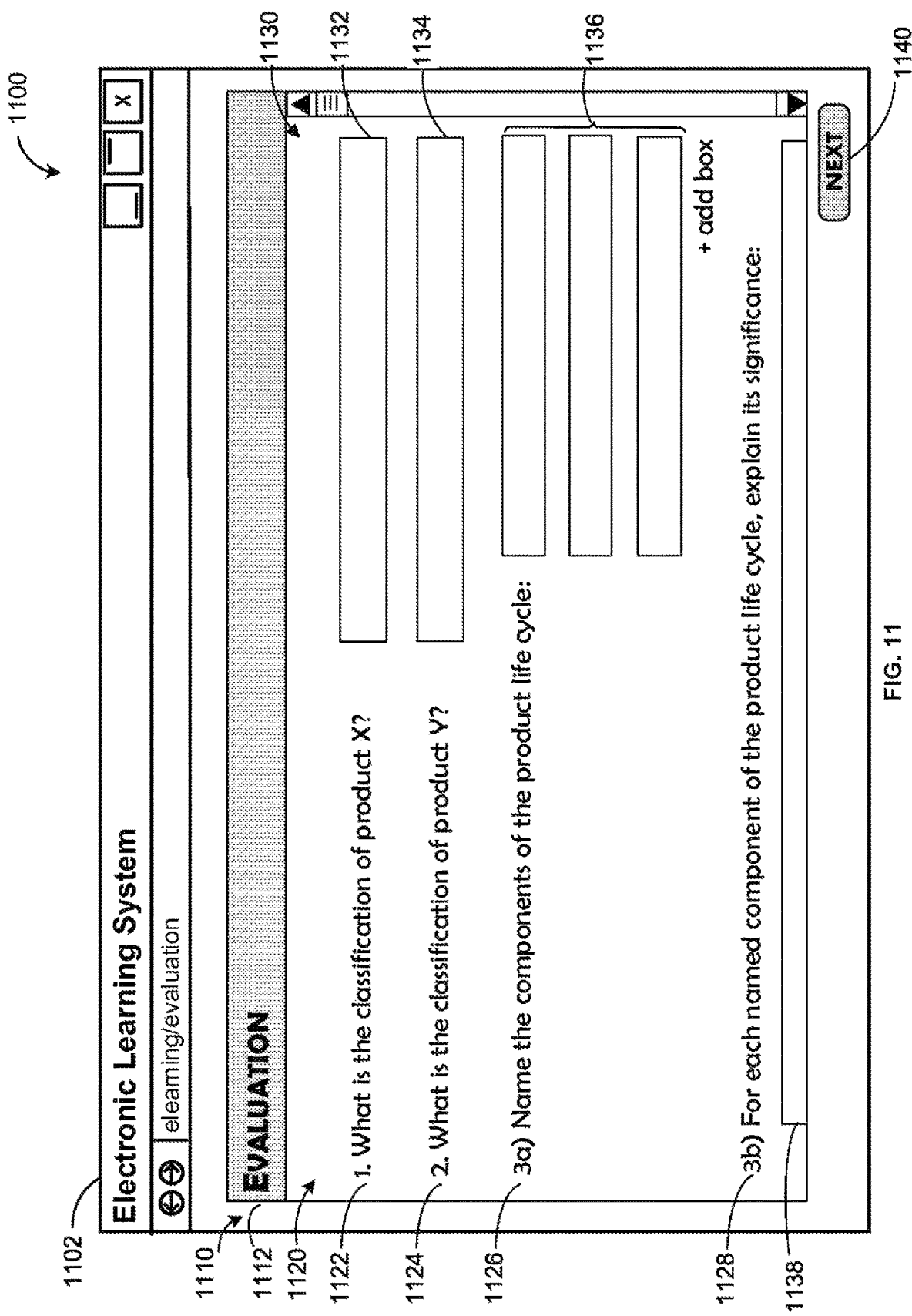
FIG. 11 is a screenshot of an example user interface providing a portion of an example evaluation tool for receiving inputs from a user, in accordance with an example embodiment.

Referring now to FIG. 11, a screenshot 1100 of an example user interface 1110 providing a portion of an example evaluation tool 1112 for receiving inputs from the user is shown. As shown in FIG. 11, the evaluation tool 1112 can include a list 1120 of one or more questions that represent at least one learning objective 320, 330 and each question in the list 1120 has at least one corresponding response field 1130 for receiving the user response input in respect of that question in the list 1120. For example, the list 1120 includes questions 1122, 1124, 1126 and 1128. Each question 1122, 1124 and 1128 has a corresponding response field 1132, 1134 and 1138, respectively, for receiving the user response input to those questions. Question 1126 requires a multi-part response and therefore, has a response field 1136 with three separate field components.

Also, the questions 1122, 1124, 1126 and 1128 in the example shown in FIG. 11 generally correspond to the overall learning objective 320a since the questions 1122, 1124, 1126 and 1128 are related to the topic of product development. The questions 1122 and 1124 are related to the classification of products, which correspond to the subject specific learning objective 330a, and the questions 1126 and 1128 are related to the product life cycle, which correspond to the subject specific learning objective 330b.

It will be understood that FIG. 11 only illustrates a portion of the evaluation tool 1112 and the list 1120 of questions can include one or more questions that are not shown.

At 1040, the electronic learning system 30 evaluates the received one or more user response inputs to determine a competence level of the user in respect of the at least one learning objective 320, 330.

The competence level can indicate a proficiency of the user with the at least one learning objective. The user response inputs can represent a familiarity of the user with the various learning objectives 320, 330.

In some embodiments, the evaluation component 118 can generate a score for each of the user response inputs received at 1030. The score may be a numerical value indicating whether the user response input is the correct answer to the corresponding question. The score may be generated by applying a mathematical operation to the results of the user response inputs. For example, the score may be a sum, average or maximum value of the results of the user response inputs.

The electronic learning system 30 may then determine whether the score generated by the evaluation component 118 at least satisfies a mastery threshold for that learning objective 320, 330. The mastery threshold can be a minimum score generated by the evaluation component 118 required for the user to be at the mastery level in respect of a particular learning objective 320, 330. The mastery threshold may, in some embodiments, be defined by a provider of the electronic learning system 30 and/or a user of the electronic learning system 30 (e.g., a teacher, an employer, etc.).

If the electronic learning system 30 determines that the score generated by the evaluation component 118 at least satisfies the mastery threshold, the competence level of the user is the mastery level. However, if the electronic learning system 30 determines that the score generated by the evaluation component 118 does not satisfy the mastery threshold, the competence level of the user is the satisfactory level. The satisfactory level can indicate that the user is not completely proficient with that learning objective but is not at an unreasonable proficiency level.

In some embodiments, when the electronic learning system 30 determines that the score generated by the evaluation component 118 does not satisfy the mastery threshold, the electronic learning system 30 can further determine whether the score generated by the evaluation component 118 satisfies a satisfactory threshold. The satisfactory threshold can generally be less than the mastery threshold and corresponds to a reasonable proficiency of the user in respect of that learning objective. When the electronic learning system 30 determines that the score generated by the evaluation component 118 satisfies the satisfactory threshold, the competence level of the user is the satisfactory level. However, if the electronic learning system 30 determines that the score generated by the evaluation component 118 does not satisfy the satisfactory threshold, the competence level of the user is a deficient level.

In some embodiments, the mastery threshold can require all questions in respect of a learning objective to be correctly answered by the user.

At 1050, the learning path component 114 modifies the learning path 512 for the user based on the competence level determined for the user in respect of the at least one learning objective 320, 330.

Based on the determinations of the competence level made at 1040, the learning path component 114 can modify the learning path 512 accordingly.

Figure 12:
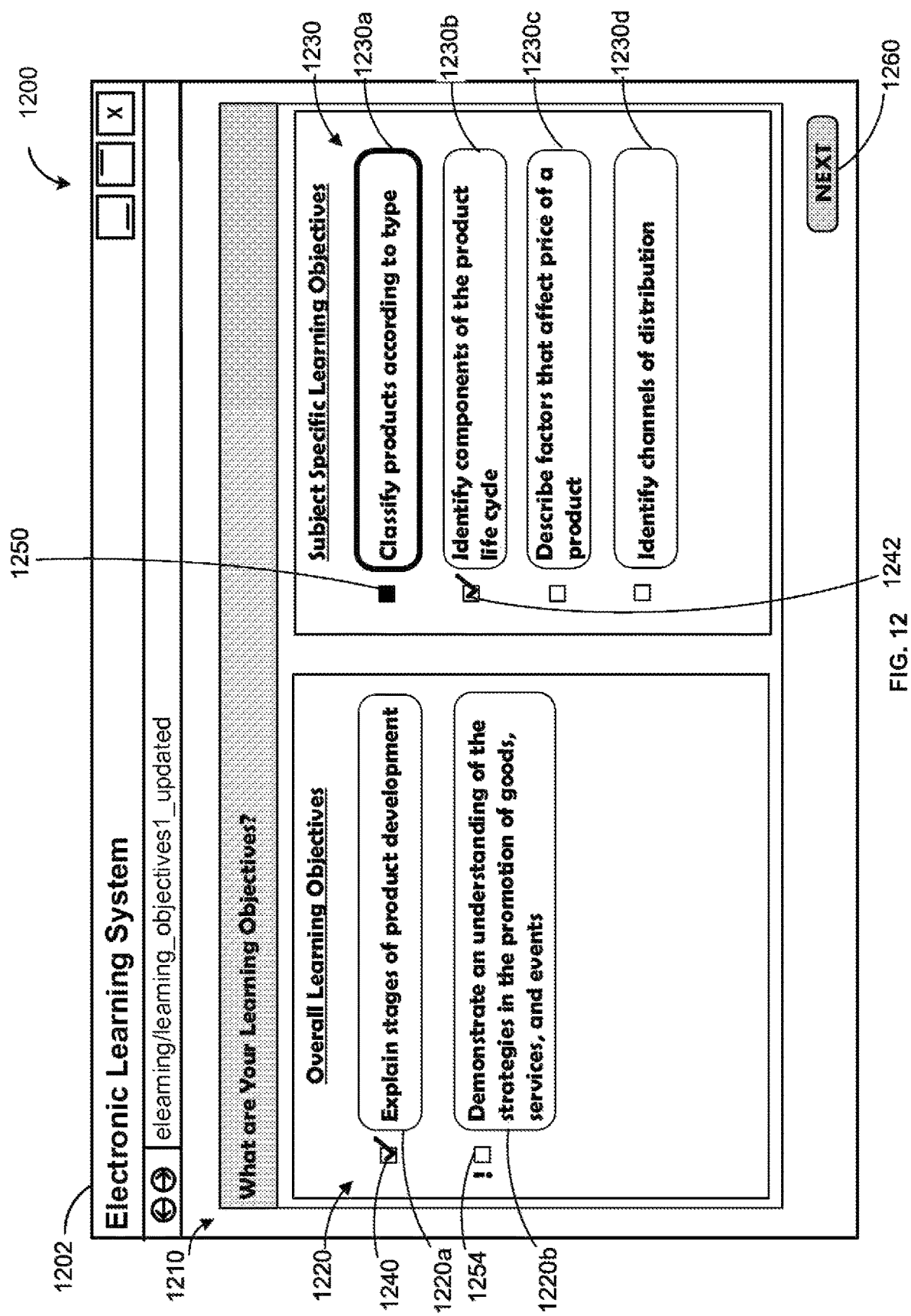
FIG. 12 is a screenshot of an example user interface showing an updated version of the learning objectives received on FIG. 4 based on the user inputs received via the user interface in FIG. 11, in accordance with another example embodiment.

Reference is now made to FIG. 12, which is a screenshot 1200 of an example user interface 1210 showing a version of the learning objectives 320, 330 based on the user inputs received via the user interface 1110 in FIG. 11.

When the learning path component 114 determines that the competence level of the user in respect of at least one learning objective 320, 330 is the mastery level, the learning path component 114 can assign that learning objective with a mastery status. The mastery status indicates that the user is proficient with that learning objective 320, 330 and therefore, minimal action, and possibly even no action, associated with that learning objective 320, 330 is required in the learning path 512. When the learning objective 320, 330 is assigned the mastery status, the learning path component 114 can assign a mastery status to that learning objective 320, 330 and modify the learning path 512 based on the statuses of each of the learning objectives 320, 330 accordingly.

For example, as shown in FIG. 12, the learning objectives 1220a and 1230b have been assigned the mastery status 1240 and 1242, respectively.

From the user response inputs received in respect of the list 1120 of questions shown in FIG. 11, the evaluation component 118 can determine that the user response inputs received in the response fields 1132, 1134, 1136 and 1138 corresponding to the questions 1122, 1124, 1126, and 1128 satisfy the mastery threshold. As a result, since the questions 1122, 1124, 1126, and 1128 correspond to the overall learning objective 1220a, the learning path component 114 can assign the mastery status 1240 to the overall learning objective 1220a. Similarly, since questions 1126 and 1128 correspond to the subject specific learning objective 1230b (assigned the mastery status 1242), the evaluation component 118 has also determined, in this example, that the user response inputs received in the respective response fields 1136 and 1138 satisfy the mastery threshold.

As a result, at least some of the learning objectives in the set of learning objectives 1220, 1230 are associated with a mastery status, as shown in FIG. 12. The learning path component 114 can then modify the learning path 512 based on the status of each of the learning objectives in the set of learning objectives 1220, 1230.

In some embodiments, one or more learning objectives 320, 330 can be assigned a mandatory status. The mandatory status can indicate that the actions in the learning path 512 associated with that learning objective are required for the user, and cannot be removed from the learning path 512 despite the electronic learning system 30 determining that the user has reached the mastery level in respect of that learning objective. That is, the mandatory status can override the effects of the mastery status 1240, 1242. The learning path component 114, therefore, can retain the actions associated with the learning objective 320, 330 assigned the mandatory status within the learning path 512.

For example, in FIG. 12, the subject specific learning objective 1230a, which corresponds to the subject specific learning objective 330a, is assigned the mandatory status 1250. As described with respect to FIG. 11, the questions 1122 and 1124 are related to the subject specific learning objective 330a. Since the evaluation component 118 determined, in the example of FIG. 12, that the user response inputs received in the corresponding response fields 1132 and 1134 satisfy the mastery threshold, the learning path component 114 can assign a mastery status to the subject specific learning objective 330a. However, due to the mandatory status 1250 also assigned to the subject specific learning objective 330a, the learning path component 114 cannot remove the actions associated with the subject specific learning objective 330a.

Continuing still with FIG. 12, in some embodiments, the learning path component 114 can determine that the competence level of the user in respect of at least one learning objective 320, 330 is the deficient level. The user is assigned the deficient level for a learning objective 320, 330 when the electronic learning system 30 determines that the response inputs received in respect of questions associated with the learning objective 320, 330 fails to satisfy the satisfactory threshold. The learning path component 114 can, as a result, assign that learning objective 320, 330 with an alert status to indicate that the user may require additional training in respect of that learning objective 320, 330.

In FIG. 12, the overall learning objective 1220b is assigned the alert status 1254. When the learning path component 114 assigns the overall learning objective 1220b with the alert status 1254, the learning path component 114 can identify additional actions related to the overall learning objective 1220b but are not already in the learning path 512. The additional actions can be different from the actions in the learning path 512 that are already being conducted. The learning path component 114 can then assign those additional actions with a recommended indicator to indicate that those additional actions are suggested for the user to improve his or her competence level but may not be required for the user to arrive at the mastery level. The electronic learning system 30, therefore, facilitates the user to improve on certain learning objectives 320, 330 but at the user's discretion.

Based on the above modifications and characterization of the learning objectives 320, 330, at least some of the learning objectives in the set of learning objectives are now associated with different statuses, as shown in FIG. 12. The overall learning objectives 1220 include a first overall learning objective 1220a (corresponding to the first overall learning objectives 320a of FIG. 4) assigned the mastery status 1240 and a second overall learning objective 1220b (corresponding to the second overall learning objectives 320b of FIG. 4). The subject specific learning objectives 1230 includes a first subject specific learning objective 1230a (corresponds to the first subject specific learning objective 330a), a second subject specific learning objective 1230b (corresponds to the second subject specific learning objective 330b from FIG. 4) assigned the mastery status 1242, a third subject specific learning objective 1230c (corresponds to the third subject specific learning objective 330c), and a fourth subject specific learning objective 1230d (corresponds to the fourth subject specific learning objective 330d). For ease of exposition, indicators are not shown in FIG. 12 for illustrating the satisfactory status associated with the learning objectives 1220b, 1230c and 1230d.

The learning path component 114 can then modify the learning path 512 for the user based on the status assigned to each learning objective of the set of learning objectives 1220, 1230. An example learning path 1312 will now be described with reference to FIG. 13, which is a screenshot 1300 of an example user interface 1310 showing the learning path 1312 generated based on the learning objectives 1220, 1230 in FIG. 12.

The learning path 1312 includes a first series of actions 1330 associated with the second group 520b of the learning path 512, a second series of actions 1340 associated with the third group 520c of the learning path 512 and a third series of actions 1350 associated with a new group 1320 ("Promotion of Products and Services").

Unlike the learning path 512 of FIG. 6, the learning path 1312 does not include the first series of actions 530 associated with the first group 520a. When generating the learning path 512 based on the learning objectives 1220, 1230, the learning path component 114 can determine that the learning path 1312 does not require the first series of actions 530 associated with the first group 520a since the overall learning objective 320a is assigned the mastery status 1240 and the first series of actions 530 is generally introductory content directed at gaining some feedback data from the user via the actions 534 and 536.

Figure 13:
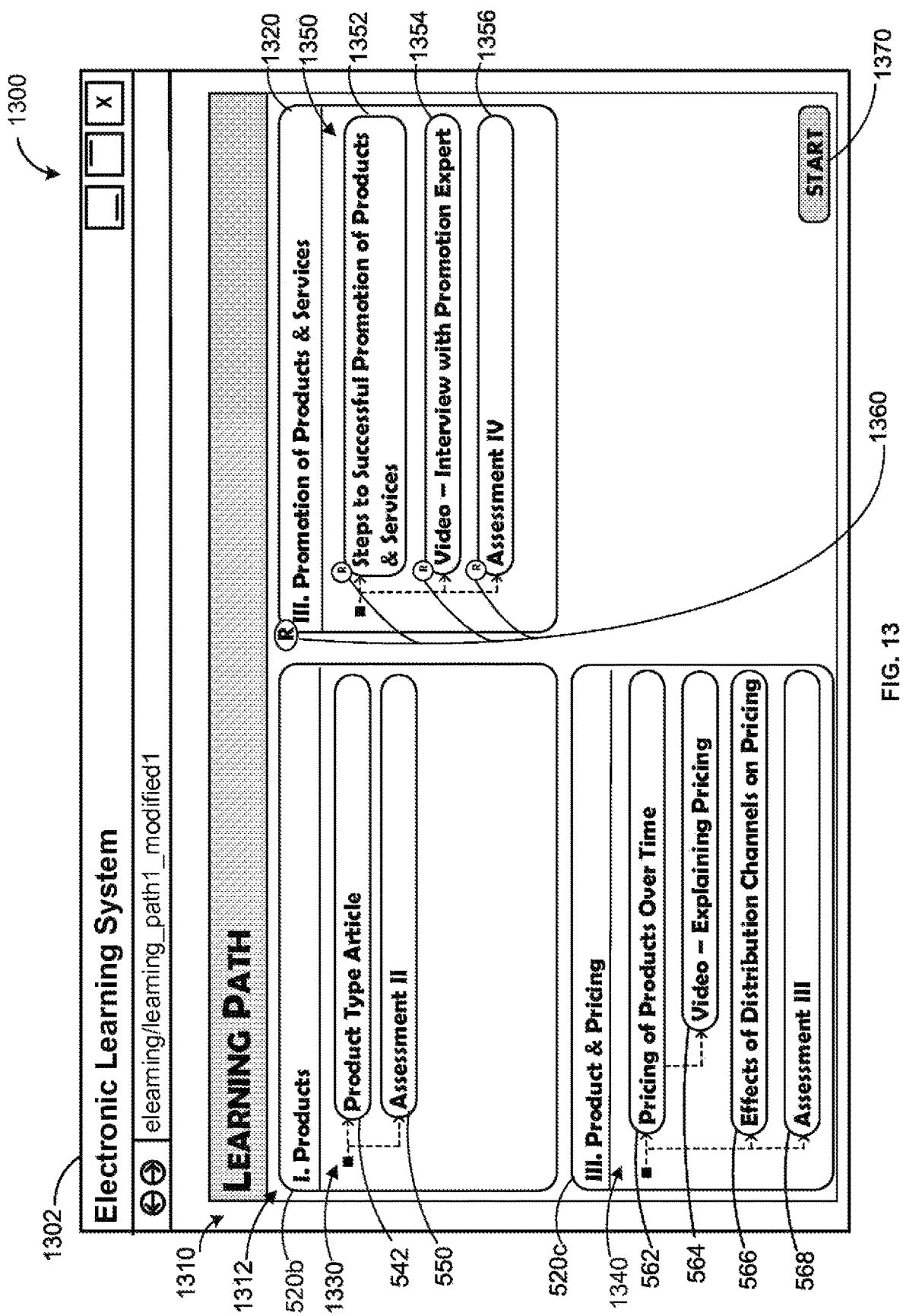
FIG. 13 is a screenshot of an example user interface showing an example learning path generated based on the learning objectives in FIG. 12, in accordance with an example embodiment.

Also, based on the alert status 1254 assigned to the overall learning objective 1220b, the learning path component 114 generated the learning path 1312 to include the third series of actions 1350 associated with the new group 1320. As shown in FIG. 13, each of the actions 1352, 1354, and 1356 in the third series of actions 1350 is assigned the recommended indicator 1360 to indicate that those actions 1352, 1354, and 1356 are only recommendations.

Unlike the learning path 512, the first series of actions 1330 associated with the second group 520b includes only the actions 542 and 550, and does not include the actions 544, 546 and 548. The learning path component 114 has removed the actions 544, 546 and 548 from the learning path 1312 since the corresponding learning objective 330b is assigned the mastery status 1242.

Figure 14:
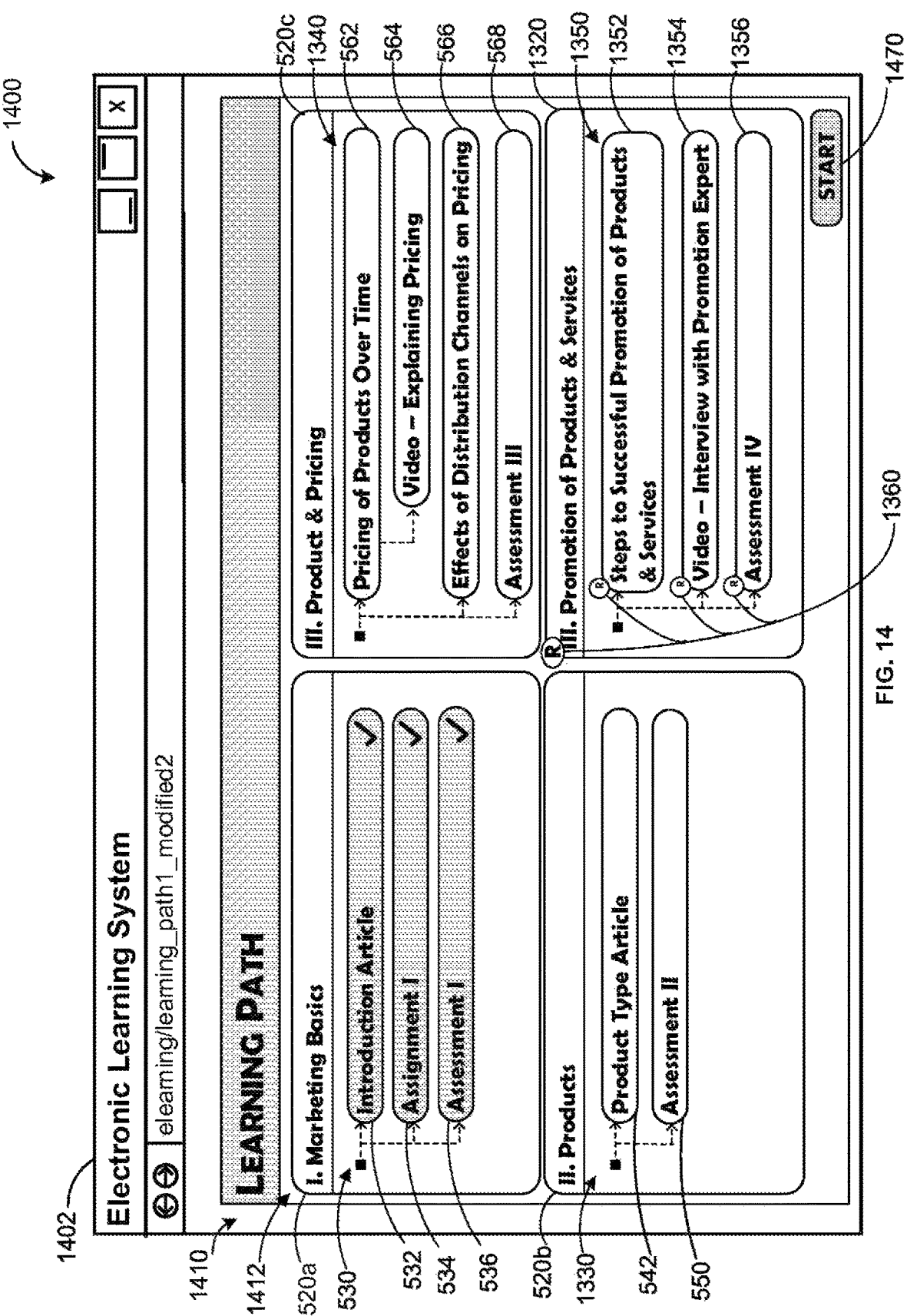
FIG. 14 is a screenshot of an example user interface showing another example learning path generated based on the learning objectives in FIG. 12, in accordance with another example embodiment.

Reference is now made to FIG. 14, which is a screenshot 1400 of an example user interface 1410 showing another example learning path 1412 generated based on the learning objectives 1220, 1230 in FIG. 12.

As can be seen from FIGS. 13 and 14, the actions in the learning path 1412 are generally similar to the learning path 1312 except the learning path 1412 includes the first series of actions 530 associated with the first group 520a from FIG. 6. Unlike the learning path 1312, the learning path component 114 generated the learning path 1412 in response to receiving user response inputs while the user was progressing through the learning path 512 of FIG. 6 so that a first portion of the learning path 512 has already been completed by the user while a remaining portion of the learning path 512 is incomplete.

In the example of FIG. 14, the user response inputs can be received as part of the action 536 when the user accesses the resource, Assessment I. The content of Assessment I may correspond to the content of the evaluation tool 1112 of FIG. 11. The first series of actions 530 is complete but the remaining sets of actions 540 and 560 of FIG. 6 are not.

Based on the response user inputs received via the action 536 in respect of the "Assessment I", the electronic learning system 30 can evaluate those received response user inputs according to 1040 of FIG. 10. The learning path component 114 can then modify the remaining portion of the learning path 512, such as the remaining series of actions 540 and 560, based on the competence levels determined at 1040. To modify the remaining portion of the learning path 512, the learning path component 114 can determine whether any action of the series of actions 540 and 560 corresponds to the learning objectives 320a and 330b, which have been assigned the mastery status 1240 and 1242, respectively.

For ease of exposition, the example learning path 1412 shown in FIG. 14 is modified by the learning path component 1114 on the assumption that the content of the "Assessment I" corresponds to the list 1120 of questions so that the response user inputs received via the action 536 will be the same as the response user inputs received in respect of the list 1120 in FIG. 11, and therefore, the set of learning objectives correspond to the learning objectives shown in FIG. 12. The remaining series of actions 540 and 560 of the learning path 512 is modified in the same manner as the learning path 1312 shown in FIG. 13. The learning path 1412, therefore, includes the series of actions 530, 1330, 1340 and 1350.

Figure 15:
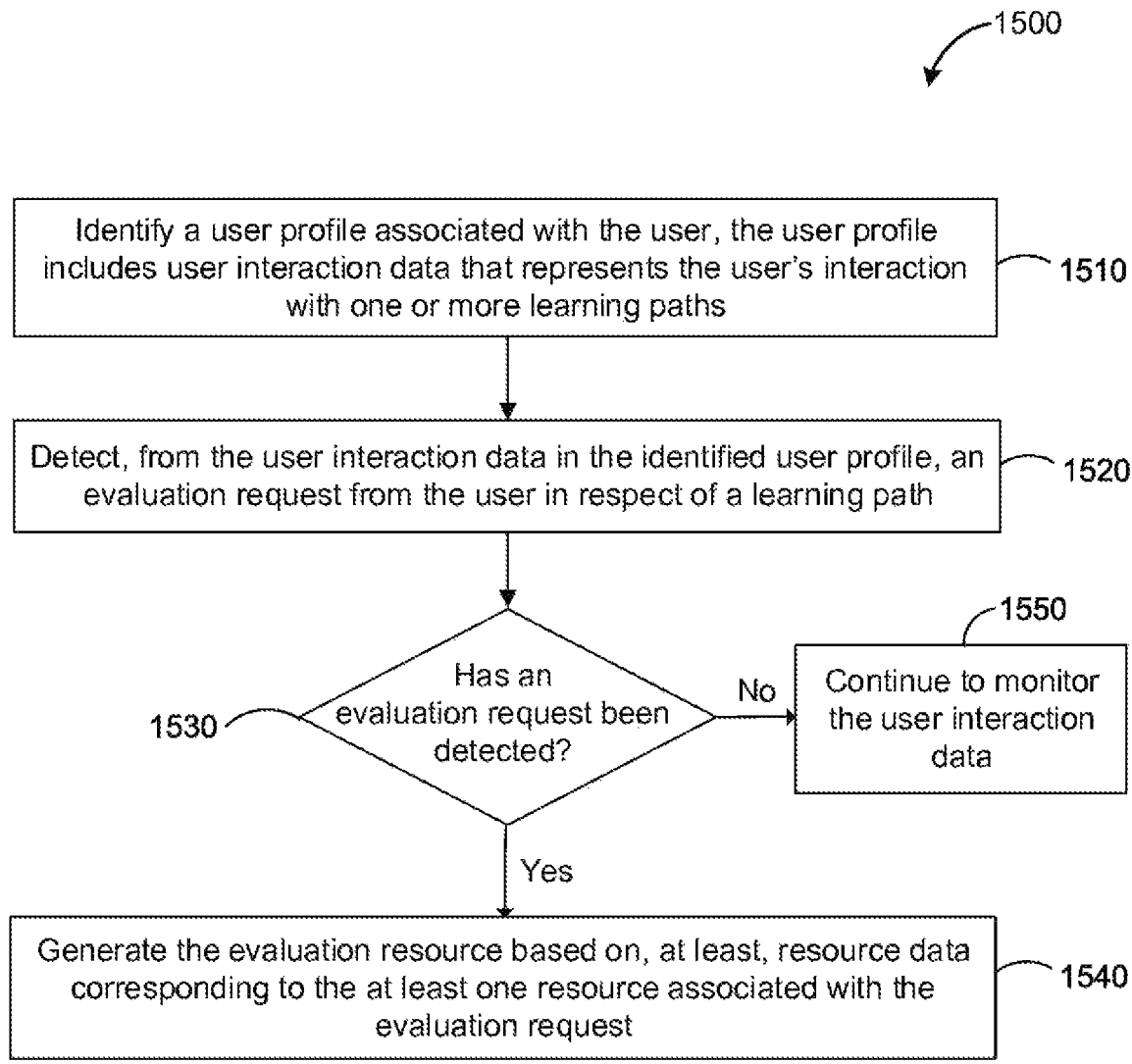
FIG. 15 is a flowchart diagram of an example method for providing evaluation resources for the electronic learning system, in accordance with an example embodiment.
Figure 16:
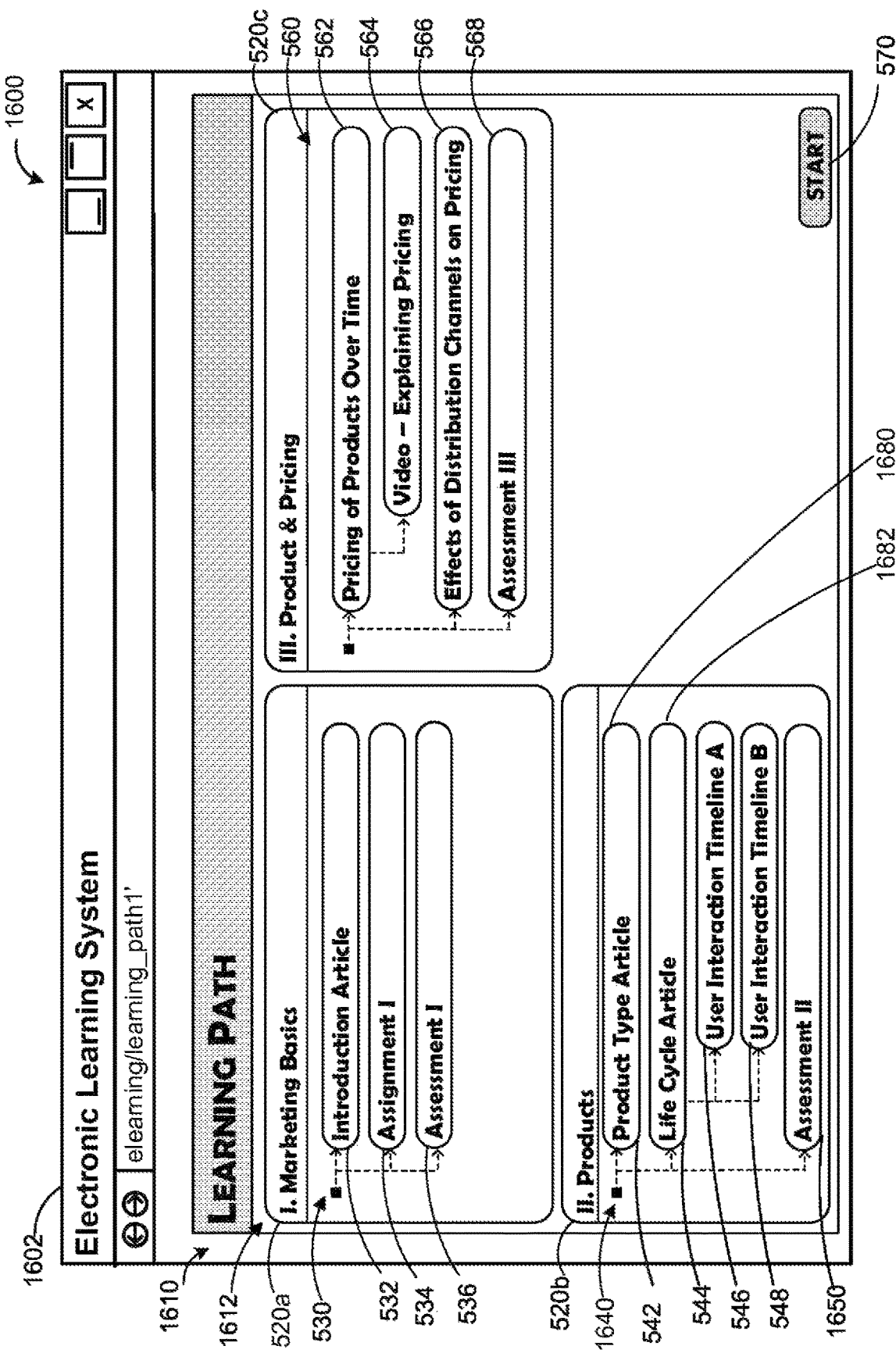
FIG. 16 is a screenshot of an example user interface showing another example learning path generated based on the example learning objectives received via the user interface in FIG. 4, in accordance with an example embodiment.

Referring now to FIG. 15, which is a flowchart diagram of a method 1500 for providing an evaluation resource for a user 12, 14 of the electronic learning system 30. Reference will be made to, at least, FIGS. 15 to 17 for illustrating the method 1500. The method 1500 can be used, in some embodiments, to dynamically generate evaluation resources during the user's interaction with a learning path 1612. The example learning path 1612 corresponds to the learning path 512 shown in FIG. 6. Unlike the learning path 512, a dynamically generated evaluation resource can be generated by the electronic learning system 30 when the user 12, 14 activates the action 1650 in the learning path 1612.

With dynamic evaluation resources, the electronic learning system 30 may customize the evaluation resources. For example, the electronic learning system 30 may customize the evaluation resource based on the user's prior interaction with the learning path 1612, such as recent actions within the learning path 1612, strengths and/or weaknesses demonstrated in the prior interactions, and/or characteristics of prior actions in respect of certain resources (e.g., a length of time spent on an action in respect of a particular resource, etc.). Other factors may similarly affect how the content of the evaluation resource may be customized. By providing evaluation resources based on, at least, the user's interaction with the learning path 1612, the electronic learning system 30 can obtain usage data that is representative of the user's current knowledge in respect of the various learning objectives 320, 330 associated with the learning path 1612. With the data resulting from the user's interaction with the evaluation resource, the electronic learning system 30 may then determine whether the remainder of the learning path 1612 requires adjustments in order to accommodate the learning of that user 12, 14.

At 1510, the system processor 110 identifies, from the one or more user profiles, a user profile associated with the user 12.

As described, the user database 144 can store user profiles for each of the users 12, 14 of the electronic learning system 30. Each user profile can include user interaction data that represents the user's interaction with the relevant learning paths provided by the electronic learning system 30.

For example, when the user 12 interacts with the learning path 1612, the user database 144 can store user interaction data corresponding to the various actions conducted by the user 12 in respect of the learning path 1612, such as when the user 12 conducts the action 542 (e.g., reading the article regarding product types) in the second series of actions 1640 in the learning path 1612. The user interaction data corresponding to the action 542 can include a time and date of when the action 542 was initiated, and/or a length of time the user 12 spent on the action 542. Other data in respect of the action 542 may similarly be stored as the user interaction data in the user database 144.

Similarly, when the user 12 initiates the action 1650 (e.g., conducting "Assessment II"), the user database 144 can store user interaction data indicating that the user 12 has submitted an evaluation request. Based on the evaluation request, the system processor 110 can determine that the evaluation resource is to be generated and to be provided to the user 12.

At 1520, the system processor 110 detects, from the user interaction data in the identified user profile, an evaluation request from the user in respect of the learning path 1612.

The evaluation request may be associated with at least one resource in the learning path 1612. For example, the evaluation request can be associated with the resources 1680 and 1682, namely the "Product Type Article" and the "Life Cycle Article". In response to the evaluation request, the system processor 110 may then generate the evaluation resource based on the content of each of resources 1680 and 1682.

In some embodiments, the evaluation request may be generated in response to actions in the learning path 1612 that are not directly related to evaluation resources. For example, when the user 12 selects the action 542 in respect of the resource 1680, the action 542 can include a submission of an evaluation request to the electronic learning system 30.

At 1530, the system processor 110 determines whether an evaluation request has been detected.

When the system processor 110 has not detected the evaluation request, the system processor 110 can proceed to 1550 to continue to monitor the user interaction data for any evaluation request. However, when the system processor 110 detects the evaluation request, the system processor 110 can proceed to 1540. In the example shown in FIG. 16, as briefly described, the system processor 110 can receive the evaluation request when the action 1650 is selected.

At 1540, the system processor 110 generates the evaluation resource based on, at least, resource data corresponding to the at least one resource associated with the evaluation request.

Figure 17:
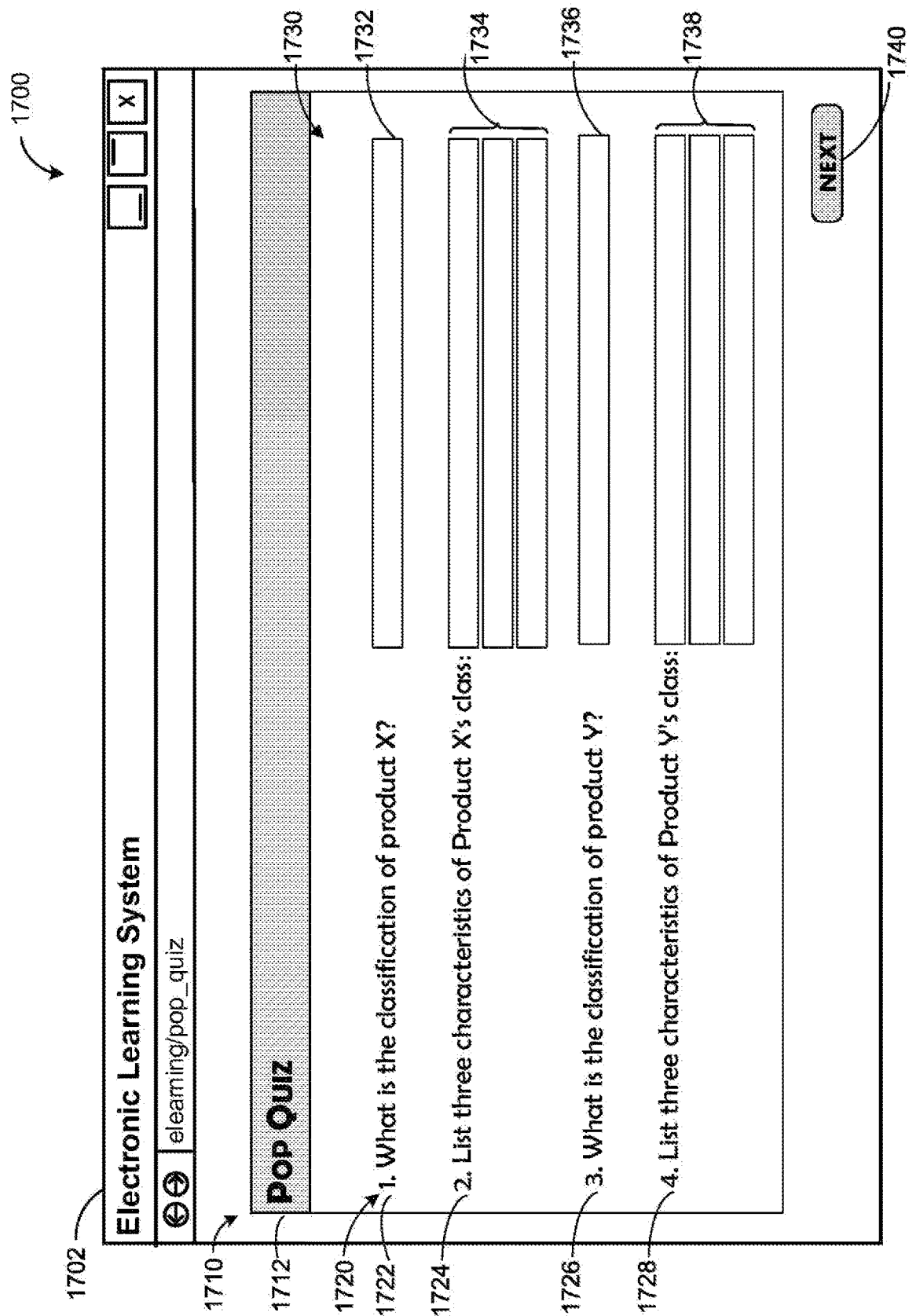
FIG. 17 is a screenshot of an example user interface providing an evaluation resource in accordance with an example embodiment.

FIG. 17 is a screenshot 1700 of an example user interface 1710 providing an evaluation resource 1712. The evaluation resource 1712 shown in FIG. 17 is a dynamic pop quiz. Alternatively, the evaluation resource 1712 can be provided by the electronic learning system 30 as practice study questions for the user 12. The evaluation resource 1712 can include one or more evaluation items 1720 for evaluating the user 12.

As shown in FIG. 17, the evaluation items 1720 can include a set of questions with a corresponding set of response fields 1730 for receiving user response inputs from the user 12. The example evaluation resource 1712 shown in FIG. 17 includes four evaluation items 1720 related to the resource 1680, namely evaluation items 1722, 1724, 1726 and 1728. It is possible for the evaluation resource 1712 to include a different number of evaluation items 1720. In some embodiments, the number of evaluation items 1720 in the evaluation resource 1712 can be restricted to a desired total number as predefined by the user 12, provider of the learning path 1612 (e.g., teacher, etc.) and/or operator of the electronic learning system 30.

To generate the evaluation resource 1712, the system processor 110 may select the evaluation items 1720 from a predefined set of evaluation items stored in the resources database 142 using at least some of the methods described herein. The resources database 142, for example, can store multiple different evaluation items for each of the learning objectives 230, 330. In some embodiments, the resources database 142 can include an evaluation item database, or be in electronic communication with an evaluation item database, that is dedicated to storing the evaluation items. The evaluation item database can include one or more databases, and the one or more databases may be distributed in one or more different geographical locations.

The evaluation item database can be updated, from time to time, by the provider of the learning path 1612 (e.g., teacher, etc.) and/or operator of the electronic learning system 30. Updates to the evaluation item database can include removal of evaluation items that the provider or operator considers to no longer be useful (e.g., overly used, no longer relevant, unsuitable, etc.) and/or addition of evaluation items.

As shown in FIG. 17, evaluation items can include questions that are intended to evaluate the user's 12 knowledge in respect of a learning objective 230, 330. Other forms of the evaluation items may be available.

For example, the system processor 110 may conduct a semantic analysis between each of the evaluation items stored in the resources database 142 and the resource data associated with the resource 1692 to determine a relevance of each of the stored evaluation items to the resource 1692. As described, in some embodiments, a semantic analysis component can be operated by the system processor 110 to conduct the semantic analysis. The semantic analysis may include a comparison of the content of each resource data with a content of each evaluation item stored in the resources database 142.

The resource data can include, at least, a resource content of the resource 1680 (e.g., a content of the "Product Type Article") and/or the learning objectives for which the resource 1680 was included in the learning path 1612 to fulfill. These learning objectives can be referred to as resource learning objectives. As described above with respect to FIG. 4, the resource 1680 is included in the learning path 1612 to address, at least, the learning objective 330a (the learner is required to be able to classify products according to type). Therefore, the semantic analysis can, in some embodiments, include a comparison of the resource content with the content of each evaluation item stored in the resources database 142, and/or a comparison of the content of each resource learning objective with the content of each evaluation item stored in the resources database 142.

Based on the results of the semantic analysis, the system processor 110 can generate a relevance score for each evaluation item in the resources database 142 to indicate an estimated degree of correlation of that evaluation item to the resource content and/or each learning objective. For example, the system processor 110 can generate a resource relevance score for each evaluation item based on the semantic analysis of the resource content with the content of each evaluation item. The system processor 110 can also generate a learning objective relevance score for each evaluation item based on the semantic analysis of the content of each resource learning objective with the content of each evaluation item. Each of the resource relevance score and the learning objective relevance score is representative of an estimated degree of relevance between a particular evaluation item stored in in the resources database 142 and the resource content of the resource 1692 or the content of the learning objective 330a, respectively.

As shown in FIG. 17, the evaluation items 1722 and 1726 are directed to classifying products X and Y, respectively, and the evaluation items 1724 and 1728 are directed to the characteristics of the class of each of products X and Y, respectively.

To select evaluation items 1722 to 1728 for the evaluation resource 1712, the system processor 110 can conduct a semantic analysis of the relevant contents. For example, the system processor 110 can conduct a semantic analysis of the resource content of the resource 1680, which is an article regarding product types, with each evaluation item stored in the evaluation item database. The system processor 110 can assign a resource relevance score to each evaluation item in the evaluation item database based on the semantic analysis. Similarly, the system processor 110 can conduct a semantic analysis of the content of the learning objective 330a, which requires that the learner be able to classify products according to type, with each evaluation item stored in the evaluation item database. The system processor 110 can assign a learning objective relevance score to each evaluation item in the evaluation item database based on the semantic analysis.

In some embodiments, the system processor 110 may conduct the semantic analysis in respect of a sub-group of evaluation items in the evaluation item database. For example, the evaluation item database can include a sub-group of evaluation items that is directed to product classifications. Other sub-groups may be available. An evaluation item can be assigned to one or more different sub-groups.

The system processor 110 can select the evaluation items from the evaluation item database for the evaluation resource 1712 based on the resource relevance score and the learning objective relevance score. For example, the system processor 110 can select the evaluation items for the evaluation resource 1712 by selecting the evaluation items with the highest resource relevance score and highest learning objective relevance score.

In some embodiments, the system processor 110 can combine the resource relevance score and the learning objective relevance score to generate an overall relevance score. The resource relevance score and the learning objective relevance score may be combined by applying respective weights, such as applying a resource weight to the resource relevance score and a learning objective weight to the learning objective relevance score. The overall relevance score can be a sum of the weighted resource relevance score and the weighted learning objective relevance score. For example, after conducting the semantic analysis, the system processor 110 can determine an overall relevance score for each of the evaluation items in the evaluation item database. The system processor 110 can select the evaluation items with the highest overall relevance score, such as the evaluation items 1722 to 1728 in the example shown in FIG. 17, for the evaluation resource 1712.

The sum of the resource weight and the learning objective weight can be one. For example, each of the resource weight and the learning objective weight can be 0.5. The value of the resource weight and the learning objective weight can be varied by the user 12, the operator of the electronic learning system 30, and/or the provider of the learning path 1612.

The system processor 110 can then generate the evaluation resource 1712 based on the relevance scores assigned to at least some of the evaluation items stored in the resources database 142.

In some embodiments, the system processor 110 can generate the evaluation resource 1712 by selecting the evaluation items stored in the resources database 142 with a relevance score that exceeds a relevance threshold value. The evaluation items with a relevance score exceeding the relevance threshold value can be referred to as the relevant evaluation items. The relevance threshold value can be a minimum relevance score required for that evaluation item to be included in the evaluation resource 1712. The system processor 110 can include the evaluation items stored in the resources database 142 with a relevance score that exceeds the relevance threshold value into the evaluation resource 1712 and exclude all evaluation items stored in the resources database 142 with a relevance score that is equal or less than the relevance threshold value. Referring again to the example shown in FIG. 17, prior to selecting the evaluation items 1722 to 1728, the system processor 110 can first determine whether the respective overall relevance scores exceed the relevance threshold value and include the evaluation items 1722 to 1728 in response to determining the respective overall relevance scores exceed the relevance threshold value.

The relevance threshold value may vary for different evaluation resources 1712 and/or may be varied by the user 12, the operator of the electronic learning system 30, and/or the provider of the learning path 1612. For example, the relevance threshold value may be adjusted when the system processor 110 determines that the number of relevant evaluation items fails to meet the desired number of evaluation items. In those cases, the system processor 110 may automatically decrease the relevance threshold value by a predefined amount or the system processor 110 may generate an error message to the operator of the electronic learning system 30 and/or the provider of the learning path 1612 indicating that the relevance threshold value is too high. If the number of relevant evaluation items is satisfactory, the system processor 110 can maintain the predefined relevance threshold value without varying it.

In some embodiments, the system processor 110 may generate the evaluation resource 1712 with reference to historical usage data stored in the resources database 142 in respect of the selected evaluation items 1720. For example, each time that a user interacts with an evaluation item in the resource database 142, the system processor 110 can update a corresponding system learn value for that evaluation item. The system learn value can be determined based on a frequency in which other users of the electronic learning system 30 has responded correctly to that evaluation item. As more and more users interact with the electronic learning system 30 and the evaluation items in the resources database 142, the system learn value can be increasingly representative of the appropriateness of the evaluation item 1720 in evaluating the knowledge of the user 12 in respect of the relevant learning objections 230, 330. The electronic learning system 30 may track each of the system learn values in the resources database 142.

The system learn may be a numerical value. For example, the system learn value of an evaluation item may be a ratio of a number of correct responses and a total number of attempts at responding to that evaluation item.

For example, when the system learn value is high, the system processor 110 can determine that the respective evaluation item 1720 may be too easy since most users who interacted with that evaluation item 1720 has responded correctly. When the system learn value is low, the system processor 110 can determine that the respective evaluation item 1720 may be too difficult since most users who interacted with that evaluation item 1720 has responded incorrectly.

When the system processor 110 determines that the system learn values are available for the relevant evaluation items, the system processor 110 may select a subset of the relevant evaluation items as the evaluation items 1720. For example, the system processor 110 may select the evaluation items assigned the system learn value within a median range of the overall range of the system learn values as the evaluation items 1720. The evaluation items assigned the system learn values within the median range can be items to which a similar number of users answered correctly and incorrectly. Those evaluation items 1720 can be more suitable for evaluating the user 12

To select the evaluation items with system learn values within the median range, the system processor 110 can determine a median value for the system learn values of the relevant evaluation items. The system processor 110 can select the desired number of evaluation items 1720 with system learn values closest in value to the median value. For example, the system processor 110 can select the evaluation item with a first system learn value that is closest in value to the median value, and can then select another evaluation item with a second system learn value that is next closest in value to the median value but not closer in value to the median value than the first system learn value. The system processor 110 can continue to select the evaluation items 1720 from the relevant evaluation items until the desired number of evaluation items 1720 is met.

The embodiments herein have been described here by way of example only. Various modification and variations may be made to these example embodiments. Also, in the various user interfaces illustrated in the figures, it will be understood that the illustrated user interface text and controls are provided as examples only and are not meant to be limiting. Other suitable user interface elements may be possible.

We claim:

1. A method for improving resource content mapping for an electronic learning system, the method comprising:
    receiving an electronic resource comprising a content having one or more resource property fields defining at least one characteristic of the electronic resource;
    sectioning the content data into one or more content portions based on an analysis of at least one of the content data and the one or more resource property fields;
    assigning a relevance score for the at least one content portion in respect of at least one learning objective of the one or more learning objectives;
    determining if the relevance score assigned to the at least one least one content portion satisfies a relevance threshold for that learning objective;
    in response to determining the relevance score at least satisfies the relevance threshold, assigning the at least one content portion with that learning objective;
    determining, by semantic analysis, a first semantic correlation score between the at least one content portion and a resource-associated learning objective, and a second semantic correlation score between the at least one content portion and a content-associated learning objective;
    generating a combined correlation score by combining the first and second semantic correlation scores by one or more weighting factors; and
    selecting, based on the combined correlation score, the at least one content portion for inclusion in a user-specific learning path associated to the learning objective.

2. The method of claim 1, wherein sectioning the content data into the one or more content portions based on the analysis of the at least one of the content data and the one or more resource property fields comprises:
    determining whether the one or more resource property fields includes one or more resource structure fields, the one or more resource structure fields defining a content structure of the content data and the content structure including one or more data hierarchy levels; and
    in response to determining the one or more resource property fields includes the one or more resource structure fields, sectioning the content data into the one or more content portions according to at least one data hierarchy level of the one or more data hierarchy levels.

3. The method of claim 1, wherein assigning the at least one content portion to the at least one learning objective comprises:
    applying a semantic analysis to the at least one content portion and applying the semantic analysis to each learning objective of the one or more learning objectives;
    based on results of the semantic analysis, assigning the relevance score, the relevance score representing an estimated degree of correlation between the at least one content portion and the at least one learning objective; and
    in response to determining the relevance score at least satisfies the relevance threshold, the relevance threshold being a minimum relevance score required for the at least one content portion to be associated with that learning objective, assigning the at least one content portion with that learning objective.

4. The method of claim 1, wherein the one or more content portions comprises two or more data hierarchy levels.

5. The method of claim 1, wherein the electronic resource comprises a video, and receiving the electronic resource for satisfying the at least one learning objective comprises transcribing an audio data into the text data.

6. The method of claim 1, wherein the electronic resource comprises an image comprising at least a portion that is convertible to text data, and receiving the electronic resource for satisfying the at least one learning objective comprises applying an electronic character recognition conversion to the image for generating the text data from the image.

7. An electronic learning system comprising:
a memory for storing one or more learning objectives; and
a processor in electronic communication with the memory, the processor operating to:
receive an electronic resource comprising a content having one or more resource property fields defining at least one characteristic of the electronic resource;
section the content data into one or more content portions based on an analysis of at least one of the content data and the one or more resource property fields;
assign a relevance score for the at least one content portion in respect of at least one learning objective of the one or more learning objectives;
determine if the relevance score assigned to the at least one least one content portion satisfies a relevance threshold for that learning objective;
in response to determining the relevance score at least satisfies the relevance threshold, assign the at least one content portion with that learning objective
determine, by semantic analysis, a first semantic correlation score between the at least one content portion and a resource-associated learning objective, and a second semantic correlation score between the at least one content portion and a content-associated learning objective; and
generate a combined correlation score by combining the first and second semantic correlation scores by one or more weighting factors; and
select, based on the combined correlation score, the at least one content portion for inclusion in a user-specific learning path associated to the learning objective.

8. The electronic learning system of claim 7, wherein the processor operates to:
determine whether the one or more resource property fields includes one or more resource structure fields, the one or more resource structure fields defining a content structure of the content data and the content structure including one or more data hierarchy levels; and
in response to determining the one or more resource property fields includes the one or more resource structure fields, section the content data into the one or more content portions according to at least one data hierarchy level of the one or more data hierarchy levels.

9. The electronic learning system of claim 7, wherein the processor operates to:
apply a semantic analysis to the at least one content portion and apply the semantic analysis to each learning objective of the one or more learning objectives;
based on results of the semantic analysis, assign the relevance score, the relevance score representing an estimated degree of correlation between the at least one content portion and the at least one learning objective; and
in response to determining the relevance score at least satisfies the relevance threshold, the relevance threshold being a minimum relevance score required for the at least one content portion to be associated with that learning objective, assign the at least one content portion with that learning objective.

10. The electronic learning system of claim 7, wherein the one or more content portions comprises two or more data hierarchy levels.

11. The electronic learning system of claim 7, wherein the electronic resource comprises a video, and the processor operates to transcribe an audio data into the text data.

12. The electronic learning system of claim 7, wherein the electronic resource comprises an image comprising at least a portion that is convertible to text data, and the processor operates to apply an electronic character recognition conversion to the image for generating the text data from the image.

* * * * *